US00RE45241E

(19) United States
(12) Reissued Patent
Walker et al.

(10) Patent Number: US RE45,241 E
(45) Date of Reissued Patent: *Nov. 11, 2014

(54) PARALLEL DATA NETWORK BILLING AND COLLECTION SYSTEM

(75) Inventors: Jay S. Walker, Ridgefield, CT (US); James A. Jorasch, New York, NY (US); Gregory Carson, Londonderry, NH (US)

(73) Assignee: QUALCOMM Incorporated, San Diego, CA (US)

( * ) Notice: This patent is subject to a terminal disclaimer.

(21) Appl. No.: 13/013,751

(22) Filed: Jan. 25, 2011
(Under 37 CFR 1.47)

Related U.S. Patent Documents

Reissue of:
(64) Patent No.: 6,684,333
Issued: Jan. 27, 2004
Appl. No.: 09/298,040
Filed: Apr. 22, 1999

U.S. Applications:
(63) Continuation of application No. 11/342,233, filed on Jan. 27, 2006, now Pat. No. Re. 42,154, which is an application for the reissue of Pat. No. 6,684,333, which is a continuation of application No. 08/732,620, filed on Oct. 16, 1996, now Pat. No. 5,949,875, which is a continuation-in-part of application No. 08/449,208, filed on May 24, 1995, now abandoned.

(51) Int. Cl.
*H04L 9/32* (2006.01)

(52) U.S. Cl.
USPC ..... 705/77; 713/168

(58) Field of Classification Search
USPC ..... 380/231, 233; 705/77, 79; 713/168
See application file for complete search history.

(56) References Cited

U.S. PATENT DOCUMENTS 2,253,596 A 8/1941 Wright
3,704,346 A 11/1972 Lloyd et al.

(Continued)

FOREIGN PATENT DOCUMENTS

DE 3709750 A1 10/1988
GB 494641 A 10/1938

(Continued)

OTHER PUBLICATIONS

"800/900 Billing Systems—Options Available," Homepage: (www.galaxy-net.com/billing.html), Undated.

(Continued)

*Primary Examiner* — Matthew Smithers
(74) *Attorney, Agent, or Firm* — Mahamedi Paradice LLP

(57) ABSTRACT

A billing and collection system comprising an access management computer for enabling payment for a service provided over a data network to be made for a telephone connection to a shared revenue billing network where the telephone connection to the billing network regulates access to the service provided over the data network, the data network including at least one information provider presenting at least one service for on-line access by a user with a user computer through the data network, the billing network and access management computer adapted for controlling access to the information provider and billing the user for access to the information provider, the access management computer communicating with the data network to enable and terminate access to the information provider through the user computer with the billing network sharing revenues for the telephone connection with the information provider.

18 Claims, 17 Drawing Sheets

(56) References Cited

U.S. PATENT DOCUMENTS

| | | | | |
|---|---|---|---|---|
| 4,192,972 | A | 3/1980 | Bertoglio et al. | |
| 4,626,630 | A | 12/1986 | Waldman | |
| 4,757,267 | A | 7/1988 | Riskin | |
| 4,763,191 | A | 8/1988 | Gordon et al. | |
| 4,789,863 | A | 12/1988 | Bush | |
| 4,827,508 | A | 5/1989 | Shear | |
| 4,852,154 | A | 7/1989 | Lewis et al. | |
| 4,977,594 | A | 12/1990 | Shear | |
| 4,987,587 | A | 1/1991 | Jolissaint | |
| 5,146,491 | A | 9/1992 | Silver et al. | |
| 5,148,474 | A | 9/1992 | Haralambopoulos et al. | |
| 5,187,710 | A | 2/1993 | Chau et al. | |
| 5,223,699 | A | 6/1993 | Flynn et al. | |
| 5,291,554 | A | 3/1994 | Morales | |
| 5,311,572 | A | 5/1994 | Friedes et al. | |
| 5,345,501 | A | 9/1994 | Shelton | |
| 5,351,286 | A | 9/1994 | Nici | |
| 5,369,699 | A | 11/1994 | Page et al. | |
| 5,388,211 | A | 2/1995 | Hornbuckle | |
| 5,392,353 | A | 2/1995 | Morales | |
| 5,394,469 | A | 2/1995 | Nagel et al. | |
| 5,418,844 | A | 5/1995 | Morrisey et al. | |
| 5,432,776 | A | 7/1995 | Harper | |
| 5,475,740 | A | 12/1995 | Biggs, Jr. et al. | |
| 5,509,070 | A | 4/1996 | Schull | |
| 5,548,645 | A | 8/1996 | Ananda | |
| 5,592,511 | A | 1/1997 | Schoen et al. | |
| 5,615,264 | A | 3/1997 | Kazmierczak et al. | |
| 5,625,690 | A | 4/1997 | Michel et al. | |
| 5,638,443 | A | 6/1997 | Stefik et al. | |
| 5,657,222 | A * | 8/1997 | Randolph | 705/21 |
| 5,737,414 | A | 4/1998 | Walker et al. | |
| 5,949,875 | A * | 9/1999 | Walker et al. | 702/78 |
| 5,978,775 | A | 11/1999 | Chen | |
| 6,201,536 | B1 * | 3/2001 | Hendricks et al. | 715/716 |
| 6,249,865 | B1 | 6/2001 | Walker et al. | |
| 6,684,333 | B1 * | 1/2004 | Walker et al. | 713/168 |
| 7,134,131 | B1 * | 11/2006 | Hendricks et al. | 725/31 |
| RE42,154 | E * | 2/2011 | Walker et al. | 713/168 |

FOREIGN PATENT DOCUMENTS

| | | | |
|---|---|---|---|
| JP | S5459052 | A | 5/1979 |
| JP | H02178795 | A | 7/1990 |

OTHER PUBLICATIONS

Blankenhorn, Dana. "Virtual Mall Opens in Cyberspace," Newsbyte, NEW06200021, Jun. 20, 1994.

"First Virtual Bank of Cyberspace," Newsbytes News Network, 05348022, Oct. 28, 1994.

"Interactive Services Association Announces Winners of 11th Annual Awards Competition," Business Wire, p. 7121251, Jul. 12, 1995.

"Logicom Brings 1-900 Billing to Web," Boardwatch Magazine, p. 29, Apr. 1996.

Newbytes News Network, 01064674, "First Virtual Offers Internet Merchant Banking, " Oct. 27, 1994.

Six pages describing the Logicom Billing System from its web site http://www.logicom.com., Copyright notice of 1996.

Telemedia News and Views, The 900 Industry: Takin' Care of Business in '94, Jan. 1994.

"Web900 by Logicom," Web Week, vol. Two, Issue Five, p. 82, Apr. 29, 1996. cited by other.

"The 900 Industry: Takin' Care of Business in '94," Telemedia News & Views, Jan. 1994.

"First Virtual Offers Internet Merchant Banking," Newsbytes News Network, 01064674, Oct. 27, 1994.

"Logicom Billing System," Homepage: (http:www.logi-com.com), Copyright notice of 1996.

* cited by examiner

PARALLEL DATA NETWORK BILLING AND COLLECTION SYSTEM

Matter enclosed in heavy brackets [ ] appears in the original patent but forms no part of this reissue specification; matter printed in italics indicates the additions made by reissue.

This application *is a continuing reissue application of U.S. reissue application Ser. No. 11/342,233 entitled "Parallel Data Network Billing and Collection System" filed on Jan. 27, 2006 now U.S. Pat. No. Re. 42,154; which is a reissue application of Ser. No. 09/298,040 of U.S. Pat. No. 6,684,333 filed Apr. 22, 1999; which* is a continuation application of U.S. patent application Ser. No. 08/732,620 entitled "PARALLEL DATA NETWORK BILLING AND COLLECTION SYSTEM" filed on Oct. 16, 1996 in the name of Jay S. Walker et al. and issued on Sep. 7, 1999 as U.S. Pat. No. 5,949,875; which is a continuation-in-part application of U.S. patent application Ser. No. 08/449,208, filed May 24, 1995, now abandoned. *Notice: More than one reissue application has been filed for the reissue of U.S. Pat. No. 6,684,333. The reissue applications are application Ser. Nos. 13/013,751 and 11/342,233, all of which are continuing reissues of U.S. Pat. No. 6,684,333.*

FIELD OF THE INVENTION

The present invention relates generally to billing for information, goods, services and the like made available to a user on a computer or data network, and more particularly, to a method for such billing and collection linked to a separate telephone connection associated with a billing network that manages and bills for access to information over the computer or data network.

BACKGROUND

With the advent of data networks such as the Internet, World Wide Web, bulletin board systems, and commercial on-line services, electronic commerce has become one of the fastest growing segments of the economy. The most readily available form of commerce is the exchange of information to an end-user for payment. While these data networks are adept at disseminating information, collection of payment has been problematic—holding back the growth of electronic commerce.

Methods of collecting payment for information can be separated into two broad categories, on-line and off-line. On-line methods include the transfer of credit card numbers and the use of digital cash. Off-line methods require the end-user to mail in cash or checks. These approaches can be cumbersome, time consuming and risky from a security standpoint.

Transferring credit card numbers via the Internet, for example, carries the risk of theft from unscrupulous computer hackers and thieves, who can tap into a server connected to the Internet and search for messages containing 16 digit numbers. Digital money systems (e.g. DigiCash, eCash, etc.) are presently a long way from practical implementation, with no standards having yet been established. Another problem associated with the use of credit cards, is that some users may not even be able to qualify for one, or have a sufficient amount of credit. Vendors are also discouraged from billing small amounts on credit cards because of the relatively high transactional costs as a percent of the sale.

While cryptographic systems will eventually enable the safe transmission of credit card numbers through cyberspace, some users will never feel completely comfortable providing their credit card numbers in this manner, even if the communications are ostensibly made secure.

Additionally, there exists a problem in that casual short-term or single usage visits to an information provider on a computer network cannot be charged in an economical manner for both the information provider and the user. For example, if an information provider wanted to charge twenty-five cents to view a one time copy of a "top ten" list, the end-user obviously would not want to set-up a credit or cash account as the expense to establish such an account would exceed the value of the one-time information obtained. The minimum practical credit card charge exceeds $2.50.

There have been attempts to use existing telephone-based billing and collection systems to bill for such information, however those have many disadvantages. One type is a 900-number-based billing system, which is cumbersome, difficult to use, and generally ineffective as described in more detail below.

Specifically, all of the existing systems use codes that are simply passwords, and are limited to the particular data site for which they were issued. These codes do not represent "value" and therefore cannot be used to control or limit access to digital data.

A second major problem with existing systems is that the information site must be "intelligent" and able to store and maintain codes in order to know which codes are valid (e.g. when does a code expire). This greatly increases the information provider's cost for providing digital information and greatly limits the number of information providers that can afford the additional overhead, thus reducing commerce and competition on data networks.

A third major problem with existing systems is that neither the data network nor the information provider are connected to the billing system. This severely limits their ability to provide even basic customer service to users of the system.

A fourth major problem with existing systems relates to the use of the 900 system itself. Information providers are limited as to the amounts charged for information. The 900-number system provider in existing systems offers no more than seven different dollar amounts they can charge on their 900-numbers. Each 900-number represents a different dollar amount charged to a consumer. For example, a 900-number system provider has three different 900-numbers, each corresponding to a different dollar value, $10, $15 and $20. An information provider using such a system for billing would be limited to those dollar amounts regardless of the value of the information they were selling. Additionally, the dollar charges cannot reflect the number of times a user, or multiple users, has had access to information, and the consumer is billed immediately for the 900-number call, even if they never receive the digital information.

A specific example of one such system is known as Web 900, offered by Logicom, Inc. In that system, the user calls a given 900-number, in exchange for which he is provided a code valid for a specified time period for unlimited access to a particular information site, and the information site locally verifies the validity of the code. There are several problems with this arrangement. First, there is no way to control access to the information by the number of uses. Users are forced to pay for unlimited access even if the user desires one piece of information or single use access. Second, since the data network has no way of preventing access to unauthorized users in possession of the code, the code could be posted to a BBS or newsgroup on the web, allowing for repeated uncontrolled use by anyone reading the posting. Third, the codes provided are usable only at a particular information site. A code provided for the purchase of five dollars worth of information at information site "A" cannot be used for the purchase of five dollars worth of information at site "B." Finally, the data network must have the ability to store codes, and must have software to verify each code entered.

SUMMARY OF THE INVENTION

A principle object of the present invention is to provide a new and improved system for selling digital data.

Another such object of the present invention is a system in which information is communicated to an end-user from a data site, while billing is implemented through a billing system, with communications between the data site and billing system managed by an access management system. A further object of the present invention is to provide such a system wherein the billing system may include a "900 type" shared-revenue telephone line.

In accordance with a first embodiment of the present invention, there is provided a method and apparatus for using an access management computer to control a user's access to digital data located at a data site, while causing a billing system to toll the user's access to the data. In this embodiment of the invention, the access-management computer receives from the billing system a first access code corresponding to the user's request for access to the digital data. The access management computer receives a second access code from the data site, and verifies that the first access code corresponds to the second access code. (The first and second billing codes may be received in either order.) The access management computer communicates a message confirming the verification to the data site, thereby authorizing the user's access to the digital data. To complete the transaction, the access management computer authorizes the billing system to post an access charge to an account associated with the user based upon the user's access to the digital data.

In accordance with a second embodiment of the invention, a method and apparatus are provided for using a billing site to toll a user's access to digital data at a data site by signaling an access management computer to authorize the user's access to the digital data. In this embodiment of the invention, the billing site receives a user's request for access to the digital data, the request for access being associated with a billing account for charging the user, and including a code corresponding to the digital data. The billing site routes to the access management computer a signal indicating that the billing site has received the code corresponding to the user request for access to the digital data. Subsequently, the billing site receives from the access management computer a signal that the user has received access to the digital data. In response, the billing site posts an access charge to the billing account based upon the user's access to the digital data.

In yet another embodiment of the invention, a method and apparatus are provided for a user to access stored digital information at a data site. In this embodiment, the user communicates to a billing system a first access code authorizing the billing system to charge his billing account for access to the stored digital information. The user receives from the billing system a second access code permitting the user to access the stored digital information at the data site. The user connects to the remote data site, and provides to the remote data site the second access code whereby to gain access to the stored digital information.

In still another embodiment of the invention, a method and system are provided for using a billing site to toll a user's access to a data site through an access management computer, wherein the user establishes a communications link between himself and the billing site, the communications link being associated with a the user's billing account. A communications link is established between the billing site and the access management computer, and the billing site sends the access management computer a signal indicating that the communications link between the user and the billing site is active. This signal authorizes the user access to the data site. Subsequently, the billing site receives from the access management computer a signal that the user has received access to the data site, and posts via the billing site an access charge to the billing account based upon the user's access to the data site.

In all of the embodiments described above, the billing site, or billing system, preferably consists of a shared-revenue telephone system—typically a "900 number" or equivalent. The data sites comprise database providers, for example, as may be found on the internet or through other means of user access. The user is typically remote, while the billing system, access management computer, and data site may be all or in some limited combination co-located.

In accordance with the foregoing, the many features and advantages of the invention will be better understood as the detailed description of the invention proceeds with particular reference to the accompanying drawings.

DETAILED DESCRIPTION OF THE PREFERRED EMBODIMENTS

The method and apparatus of the preferred embodiments of the invention will now be described with reference to FIGS.

1-6. In a preferred embodiment, the invention generally comprises an end-user system 300, data network 400, access management system 500, and 900-number network 600. The present invention allows information providers on a data network to control access to information using a system of codes, where the 900-number system functions as the billing agent. This enables an information provider to simply and economically bill in small, incremental amounts for the information provided.

System Architecture

Figure 1:
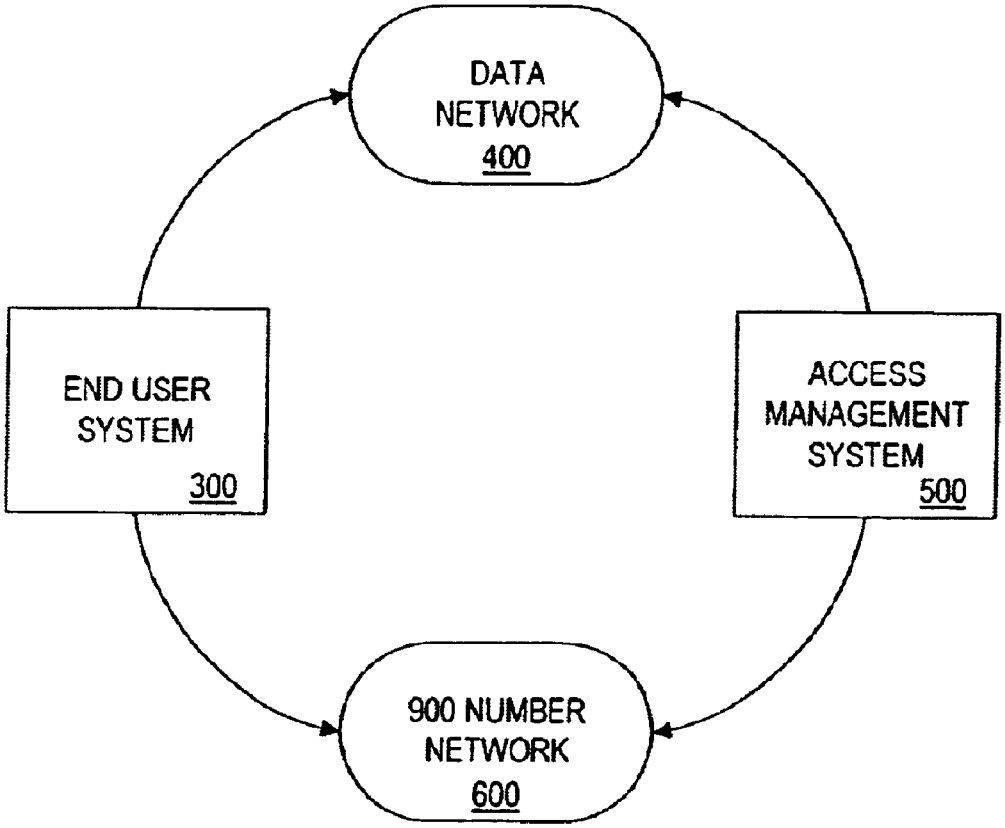
FIG. 1 illustrates a first embodiment of the present invention.

With reference to FIGS. 1-6, the system architecture for a first embodiment of the invention is illustrated. As shown in FIG. 1, the overall system comprises an end-user system 300, data network 400, access management system 500, and 900-number network 600. Access management system 500 regulates access to data network 400 and manages the billing for such access by facilitating communications between 900-number network 600, data network 400, and end-user system 300.

Figure 2:
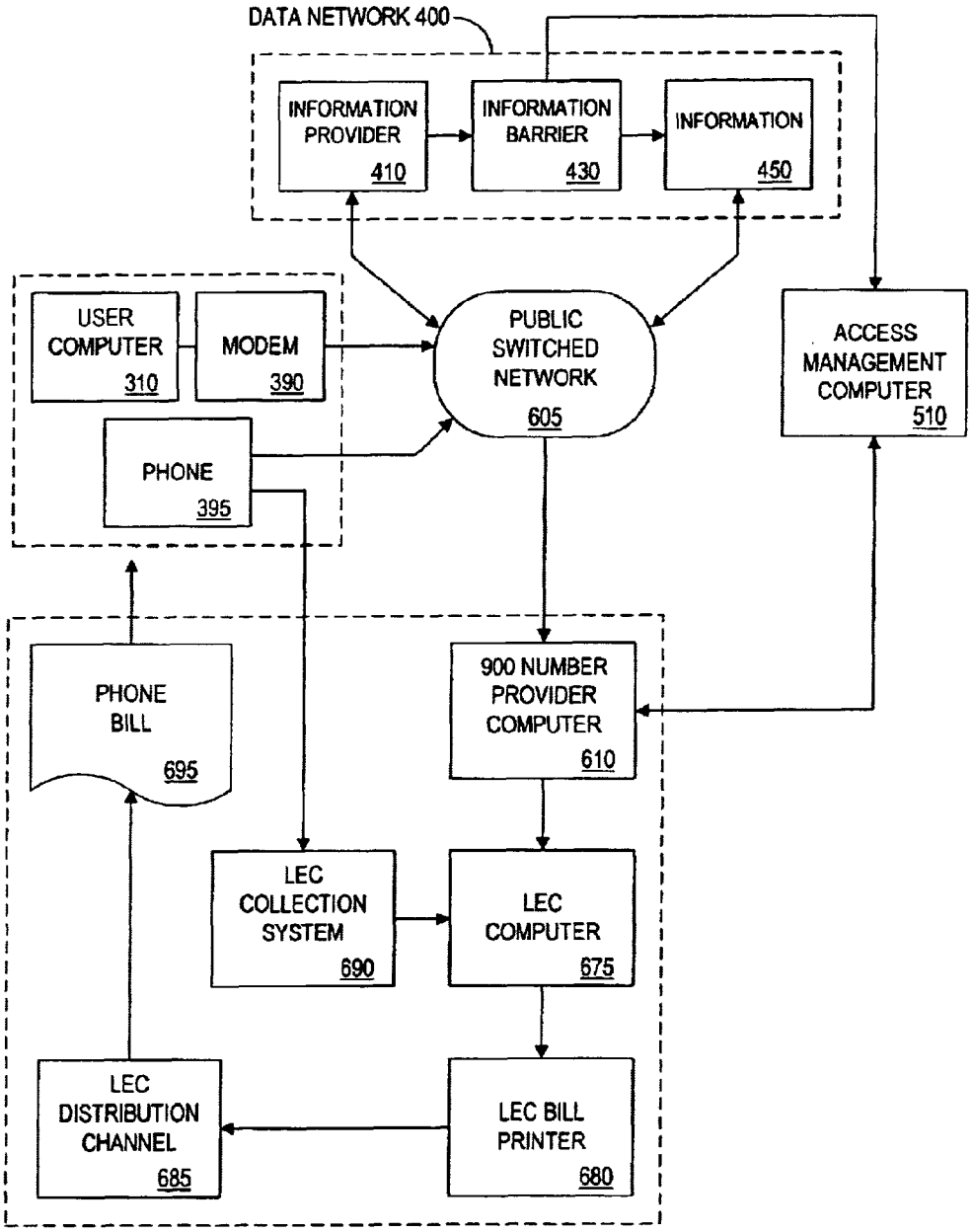
FIG. 2 is a block diagram showing one embodiment of the access management system.

FIG. 2 generally depicts the flow of information among the primary components in greater detail. The end-user accesses data network 400 through user computer 310 and modem 390, and communicates with 900-number network 600 through telephone 395 over a standard telephone connection. In this regard, those skilled in the art will appreciate that dedicated data lines, cellular telephones, Personal Communication Systems ("IPCS"), microwave links, satellite systems, or any other direct or indirect communication link may alternatively be used. The overall system facilitates the purchase of information 450 on a data network 400 by linking 900-number calls to the activation of codes necessary to retrieve the information 450.

Figure 3:
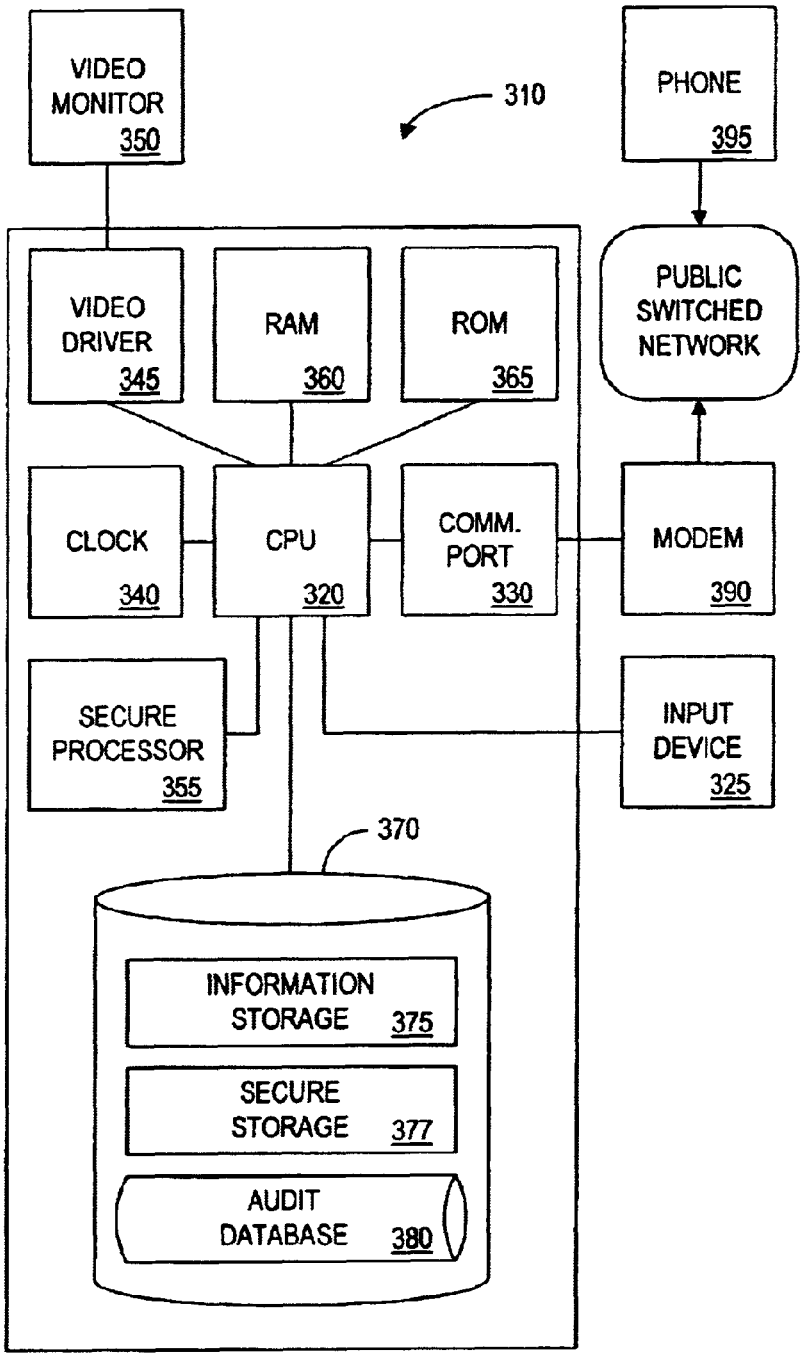
FIG. 3 is a block diagram showing an exemplary end-user site.

Referring now to FIG. 3, there is shown a block diagram of user system 300. The end-user communicates with data network 400 via end-user computer 310, which is preferably a conventional personal computer having a CPU 320, input device 325 (e.g. a keyboard or mouse), one or more communication ports 330, clock 340, video driver 345 connected to video monitor 350, secure processor 355, RAM 360, ROM 365, and data storage device 370. Data storage device 370 may be either fixed media (e.g., a hard disk) or a drive capable of reading removable media (e.g., a floppy disk or CD-ROM). Data storage device 370 may contain information storage 375, which is used for storing information 450 retrieved from data network 400. Additionally, an audit trail for information transactions may also be saved in audit database 380. The audit trail can include a record of all information purchases as well as any codes used during the process. This audit trail is useful in the event of a disputed charge or disputed bill. Secure storage 377 is used for any embodiment requiring secure storage of messages or data at end-user computer 310. End user computer 310 communicates with data network 400 through communications port 330 and modem 390 (or other communication device such as a network card or a transmitter) to enable direct communications with data network 400.

Figure 4:
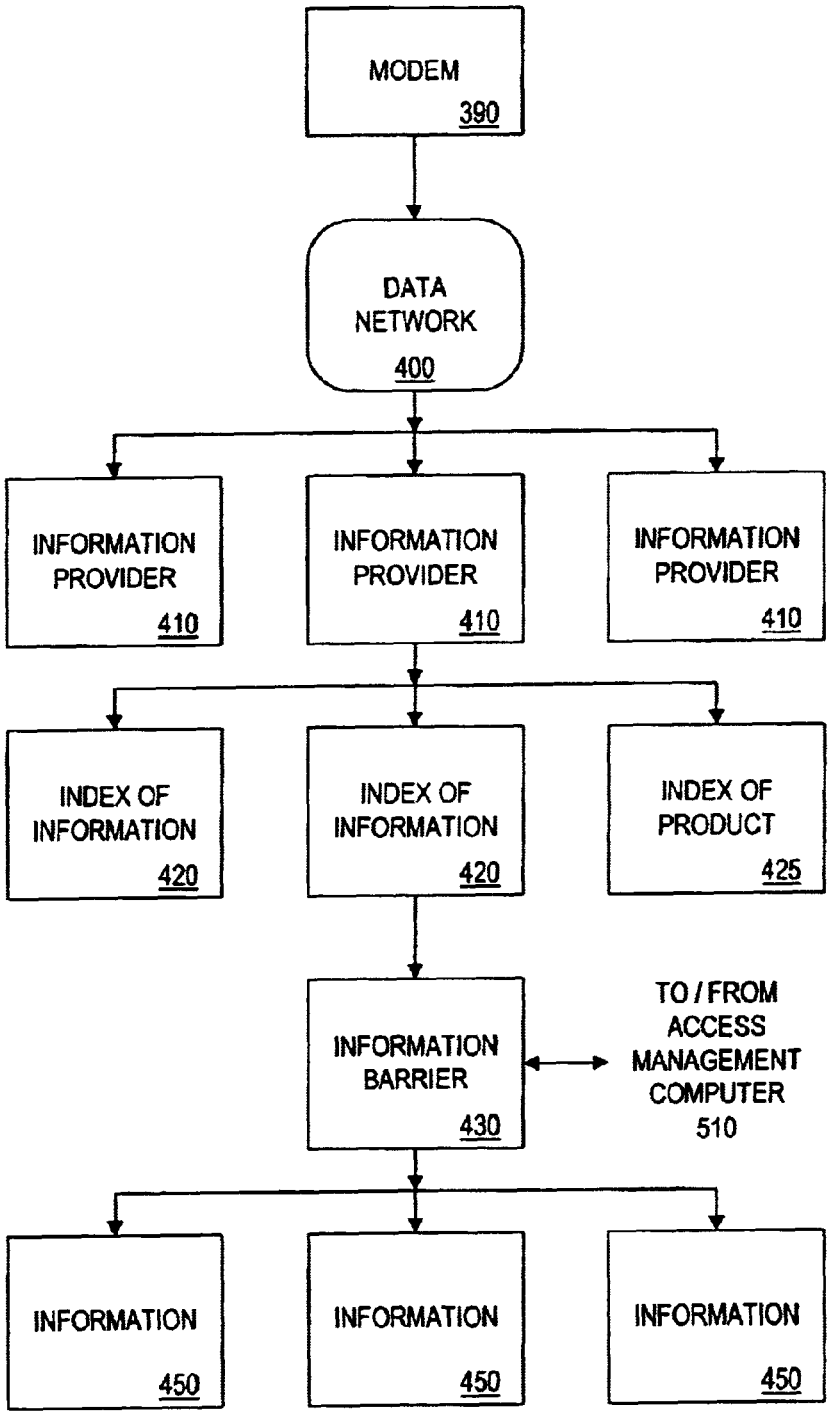
FIG. 4 is a block diagram showing an exemplary data network.

FIG. 4 is a representative block diagram of the structure of data network 400, which is comprised of at least one information provider 410. In one embodiment, data network 400 is the World Wide Web, with web pages representing the various information providers 410. Data network 400 may have a dedicated communications channel or data communications link with access management computer 510 or 900 number network (billing network) 600. For a given information provider 410 there is at least one index of information 420 which permits users to quickly find information 450. Much like the table of contents of a journal, an index of information 420 might list articles by topic, providing the author, price, size of file, etc. A web page specializing in chess game databases, for example, might list the names of ten chess grandmasters along with the number of games in each database and the price for the information. Free samples of the information may be included in the index of information 420. Each chess game database might have two or three games provided free in order to give a potential purchaser a better idea of the information that is being sold. In addition to indexes of information 420, some sites may have indexes of products 425 which describe goods available for sale. In the case of the chess site, the index of products 425 might list chess books.

To obtain access to information 450, the end-user must pass through information barrier 430. Information barrier 430 acts as a "toll-booth" at information provider 410, and is analogous to password screens that require a valid password to be inputted to obtain access to a computer. If the proper code is entered, access is granted; otherwise the barrier remains in place. Information barrier 430 determines whether the code is valid by communicating with access management computer 510 over an open channel of communication as described below.

In another embodiment, information barrier 430 itself may contain a code generator capable of issuing codes directly to the end-user, thus eliminating some of the communication between information barrier 430 and access management computer 510. This code generator either retrieves a predetermined code from a database or generates random codes. These codes may then be transmitted to access management computer 510 for validation. In yet another embodiment, information barrier 430 accepts digital "tokens" in exchange for access to information 450.

Figure 5:
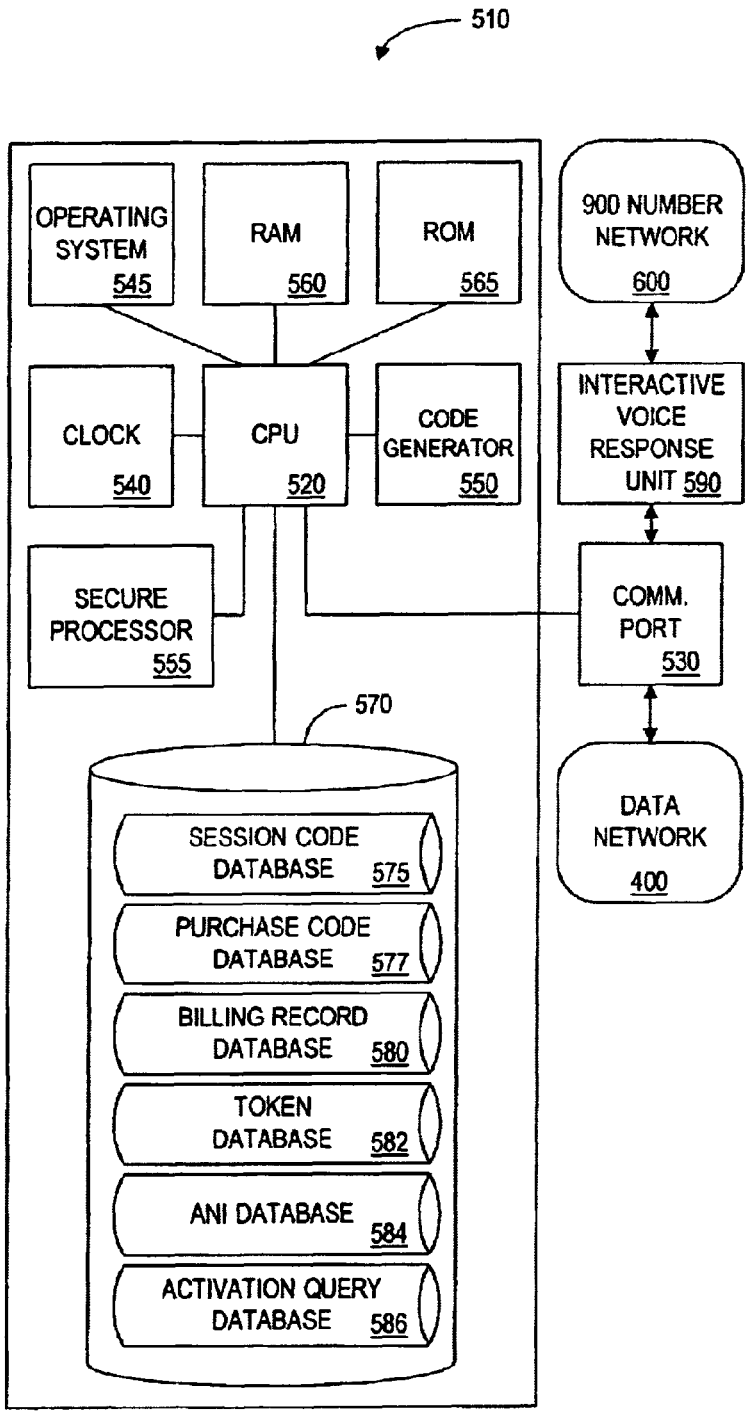
FIG. 5 is a block diagram showing an exemplary access management system.

FIG. 5 is a block diagram depicting access management system 500. This system manages the communications between data network 400 and 900-number network 600. Access management computer 510 could be a conventional mainframe computer, workstation, or personal computer depending upon the volume of transactions expected to be handled by the system. Access management computer 510 includes CPU 520, communications port 530, clock 540, operating system 545, secure processor 555, RAM 560, ROM 565, and data storage device 570. For high volume transaction processing a relatively powerful microprocessor that has a wide data bus may be a used as CPU 520. Typical of such processors are the Intel Pentium or the Motorola PowerPC 604, which both employ a 32-bit data bus. The storage device can be either fixed media (e.g., a hard disk) or a drive capable of reading removable media (e.g., a floppy disk or CD-ROM). Data storage device 570 is used to store the various databases needed in the system, such as the code databases that track the codes necessary to manage the information purchase process. The code databases include a session code database 575 and purchase code database 577. Other stored databases include a billing record database 580, token database 582, ANI database 584, and activation query database 586. Those skilled in the art will understand that each of the databases may be relational to one another, or that all of them may be combined into a single large database.

Session and purchase codes are generally described as a unique series of digits, either retrieved from a database of predetermined codes or generated at random, used to purchase information 450 or physical goods 40. Those skilled in the art will understand that there are some variations to the structure of the codes in each embodiment of the invention and they can range from a simple series of random digits to long strings or groups of digits. Optionally, each group of digits may represent a number of pieces of information including, but not limited to, cost, product description, originating ANI, time/date, server ID number, etc. The uniqueness of codes allows a high level of security. The code can be limited to one-time access, making the broadcasting on the web of a lost or stolen code useless. Thus, only the first user is able to use the code, subsequent users of the same code will be denied access. This uniqueness of codes also assures an easy and reliable method for auditing of the 900-number service provider.

Session code database 575 stores codes used to purchase information 450. To activate the codes, the end-user calls 900-number network 600 and enters the requested code, which is then processed by access management computer 510.

Purchase code database 577 stores codes used by the end-user in the physical goods purchasing embodiment. The end-user calls 900-number provider computer 610 and enters the requested code. The 900-number provider computer 610 transmits this code to access management computer 510. These codes are then transmitted to information provider 410 to authorize fulfillment Billing record database 580 stores a copy of each active session code 60 and active purchase code 80. This database provides both an audit trail for all transactions and a cross reference for the accounting of LEC charges and commissions due information providers.

Token database 582 is the repository for tokens used by the end-user for the purchase of information or physical goods 40.

ANI database 584 stores all end-user telephone number information and is closely tied to billing record database 580.

Activation query database 586 stores the queries used to determine whether or not the end-user is currently connected to 900-number network 600.

Communication port 530 allows access management computer 510 to communicate with data network 400 and 900-number provider computer 610. Communication with 900-number provider computer 610 also involves conventional interactive voice response unit (IVRU) 590. IVRUs are well known in the art (see, e.g., Jerry Fitzgerald, Business Data Communications—Basic Concepts, Security & Design, 4th ed., John Wiley & Sons, 1993) and need not be described in detail here. IVRU 590 allows the end-user and access management system 500 to interface directly over the public switched telephone network.

Figure 6:
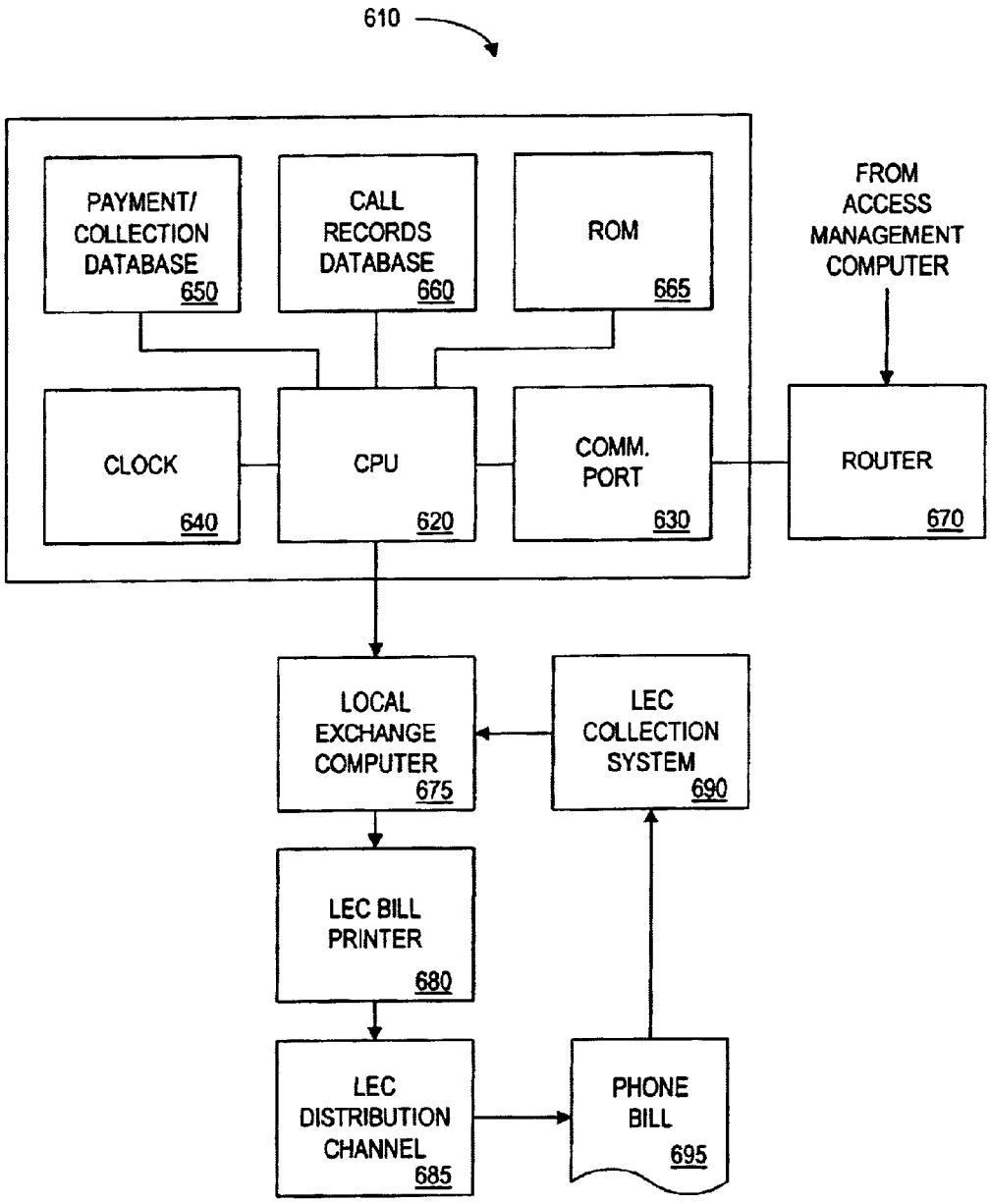
FIG. 6 is a block diagram showing an exemplary billing system.

Referring now to FIG. 6, there is shown a block diagram of 900-number network 600. This network includes a 900-number provider computer 610 which handles most of the call tracking and billing functions. 900-number computer 610 includes a CPU 620, communication port 630, clock 640, payment/collection database 650, call record database 660, and ROM 665. Communication port 630 is connected to router 670, enabling communication with access management computer 510. Billing information from 900-number provider computer 610 is transmitted to local exchange computer 675 which uses LEC bill printer 680 to generate the end-user's monthly phone bill 695. The LEC distribution channel 685 distributes phone bill 695, which generates a payment by the end-user. This payment is sent to the LEC collection system 690 and then back to the local exchange computer 675.

Dedicated communications links may be established between access management computer 510, data network 400, and 900 number network 600. Although these systems are described as being located remotely from one another, one or more of the systems may be located within the same location.

Asynchronous Embodiment

Figure 7:
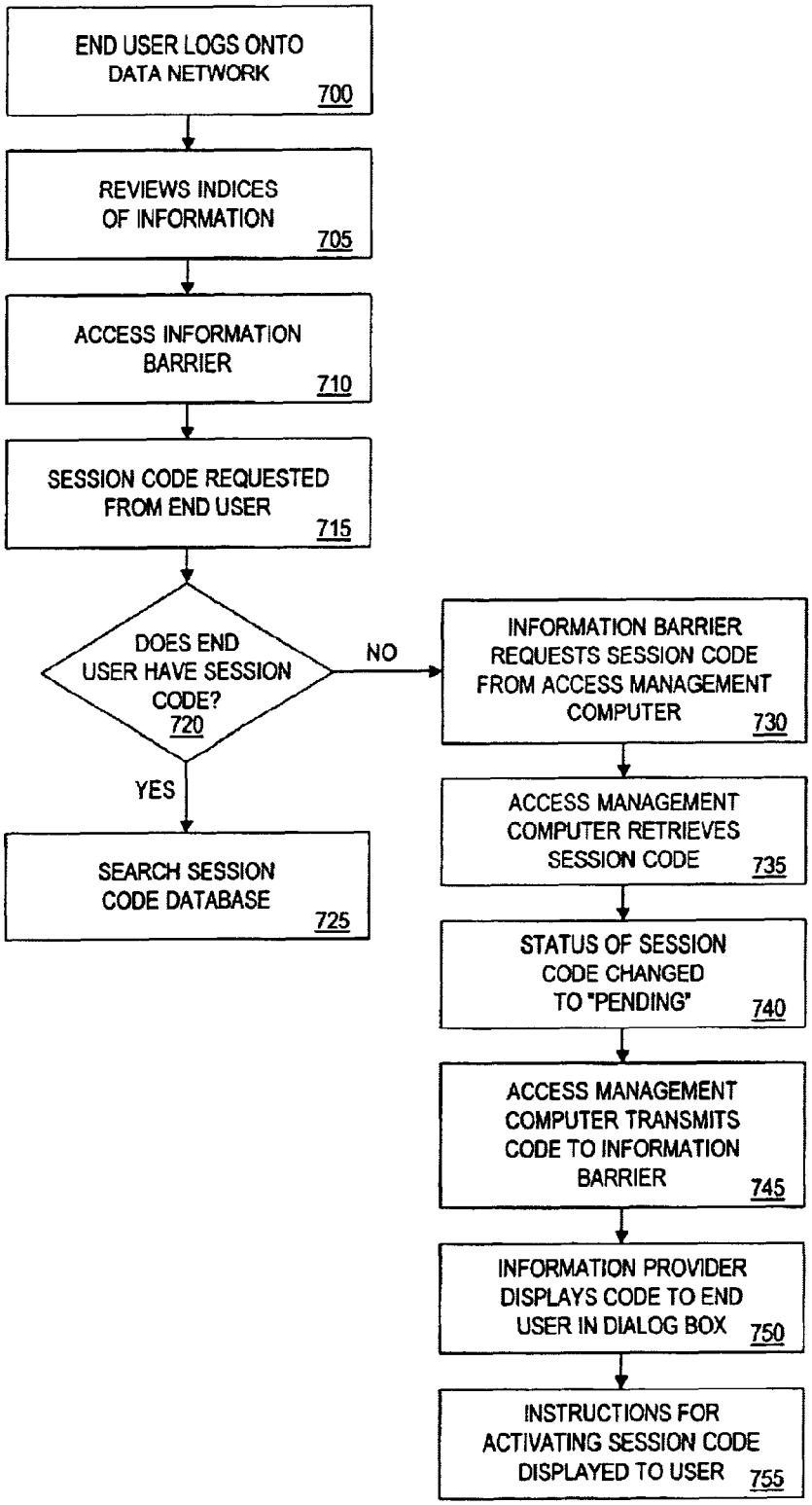
FIG. 7 illustrates an exemplary information search procedure in an asynchronous embodiment.

Referring now to FIG. 7, there is shown an exemplary embodiment for the purchase of information in which accessing the information and billing (or tolling) for accessing the information occur asynchronously (i.e., at different times). FIG. 7 describes the first of a three-part process in which the end-user finds the information, makes payment by calling the 900-number, and then returns to data network 400 to collect information 450. This procedure may be performed with the use of a single telephone line or multiple telephone lines.

At step 700 the end-user logs on to data network 400. Data network 400 may be the Internet, World Wide Web, Bulletin Board Service, or any other electronic network. As described previously, data network 400 encompasses at least one information provider 410. After the end-user reaches information provider 410, he reviews indices of information 420 at step 705 and locates information 450 that he would like to purchase. Indices of information 420 are similar to the table of contents of a book, in which chapter and sub-chapter headings provide an indication of the information to follow. Indices of information 420 may also contain short excerpts from information 450.

After finding information 450 to purchase, the end-user selects information 450 for viewing or downloading. The end-user, for example, might select a chocolate chip cookie recipe from a list of dessert recipes. Before information 450 (the cookie recipe) is made available, however, the end-user is presented with information barrier 430 at step 710. Information barrier 430 is software which requests that the end-user enter a valid code to obtain access to information 450; it is similar to data security software which denies access to a network without the proper password. There is no way to access information 450 without providing the correct access code to information barrier 430. At step 715, information barrier 430 provides a dialog box displaying a place to enter session code 50 (an access code) along with instructions for obtaining session code 50. If the end-user does not yet have session code 50 at evaluative step 720, information barrier 430 requests session code from access management computer 510 at step 730.

Access management computer 510 retrieves session code 50 from session code database 575 at step 735. Session code database 575 has three fields—code, status, and price data. The code field stores session codes 50 with one database record for each session code 50. Each session code 50 is a string of digits or letters. These digits may be randomly generated or developed by code generation algorithms such as the algorithms for generating credit card numbers. Alternatively, session codes may be sequential numbers. After being created and stored in session code database 575, each session code 50 is assigned a status. The status field has values of "unassigned," "pending," "active," and "completed." When a session code 50 having a status of "unassigned" has been sent to information barrier 430, its status is changed to "pending." After session code 50 is activated by the end-user the status is changed to "active." The status of session code 50 is changed to "completed" after the end-user has gained access to information 450. Each session code 50 also has corresponding pricing data which indicates the cost of information 450 purchased through the use of session code 50. This pricing data is updated by information barrier 430 after the end-user has selected information 450 to purchase, described at step 935.

At step 740, access management computer 510 changes the status of one session code 50 to "pending" and transmits it to information barrier 430 at step 745. Information barrier 430 displays session code 50 in a dialog box on video monitor 350 of end-user computer 310 at step 750. This dialog box provides instructions for activating session code 50, which the end-user writes down at step 755.

Figure 9:
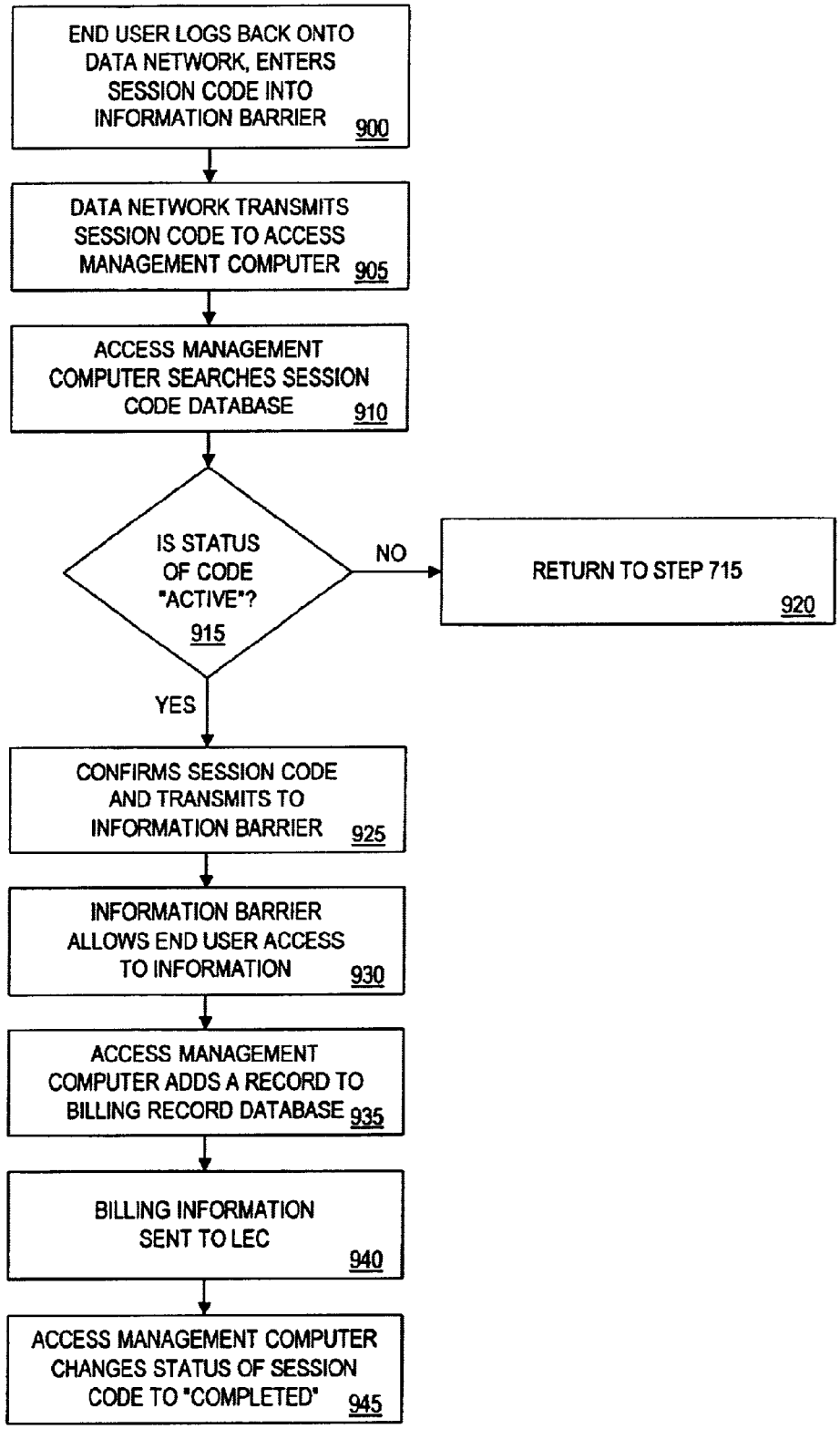
FIG. 9 illustrates an exemplary process for verifying the validity of access codes in an asynchronous embodiment.

If the end-user already has session code 50 (i.e. he has already called the 900-number to activate it) and enters it at information barrier 430, at step 725 a search of session code database 575 is performed at access management computer 510 to check the status of session code 50 to verify that its status is "active" as described at step 915 of FIG. 9.

Figure 8:
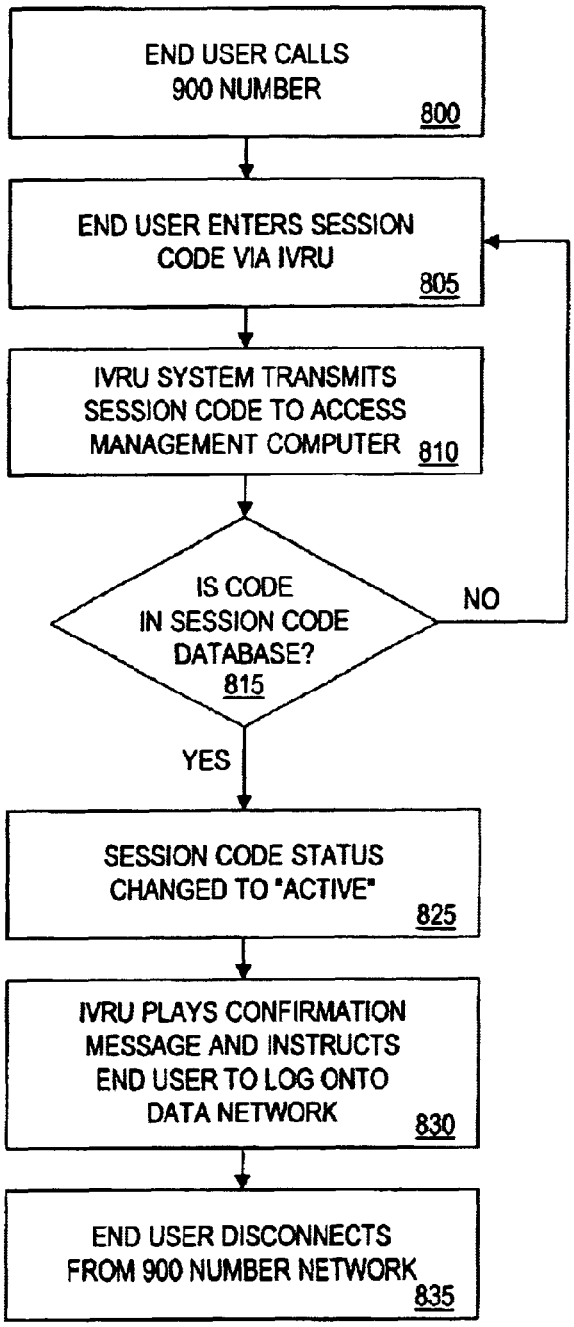
FIG. 8 illustrates an exemplary billing procedure associated with granting access to information in an asynchronous embodiment.

Referring now to FIG. 8, there is shown an exemplary embodiment for the billing procedure associated with granting access to information in the asynchronous embodiment of the present invention. This is the second step of the three-part process. The end-user calls the 900-number and connects with IVRU 590 of 900-number network 600.

At step 800 the end-user dials the 900-number provided by information barrier 430 and enters session code 50 using the touch tone keys of telephone 395 at step 805. 900-number network 600 then transmits session code 50 to access management computer 510 at step 810, and stores a copy of session code 50 along with the billing information of the call so that pricing data received from access management computer 510 may be matched with the particular call record. At step 815, access management computer 510 searches session code database 575 to determine whether session code 50 is present. If it is, the status field of the database record for session code 50 is changed to "active" at step 825. IVRU 590 then reads a confirmation message to the end-user at step 830 and instructs him to disconnect the 900-number call and return to information barrier 430 from which session code 50 was obtained. At step 835, the end-user hangs up the phone, disconnecting from 900-number network 600. If the search at step 815 reveals no matching session code 50 in session code database 575, the end-user is instructed to check the entered session code 50 and re-enter it, or return to information barrier 430 for a new session code 50 as described at step 805.

FIG. 9 illustrates an exemplary procedure for providing access to information 450 after access management computer 510 verifies that session code 50 entered by the end-user at information barrier 430 corresponds to session code 50 entered by the end user at IVRU 590 of billing system 600. At step 900, the end-user logs on to data network 400, navigates to information barrier 430 and enters session code 50. Like a department store checking the validity of a credit card by contacting a central clearinghouse, information barrier 430 contacts access management computer 510 to verify that the status of session code 50 is "active", transmitting session code 50 and pricing data (pricing information) to access management computer 510 at step 905. Access management computer 510 then searches session code database 575 at step 910 to determine whether session code 50 exists, and to check its status. This search is preferably done by CPU 520 of access management computer 510, as an alphanumeric compare searching for an identical session code 50, followed by the status check. If an identical session code 50 is found having the correct status, the first and second session codes 50 are said to correspond.

If, at step 920, session code 50 is not found in session code database 575 (or its status is not "active"), then access management computer 510 has not found a corresponding session code 50 received from 900-number network 600. Access management computer 510 then communicates a message to information barrier 430 indicating that the end-user should not be provided access to information 450. The end-user returns to step 715 at which point he is requested to enter another session code 50.

If session code 50 is found in session code database 575 and its status is "active", session code 50 is communicated back to information barrier 430 to verify that two corresponding session codes 50 have been received. This correspondence of two session codes 50 indicates that the session code is valid and that the end-user should be authorized access to information 450 at step 925.

At step 935, access management computer 510 adds the pricing data to the pricing data field of session code 50 of session code database 575 and then transfers this data to a billing record at billing record database 580. This billing information contains the end-user phone number, 900-number, time of call, date of call, length of call, price, etc. At step 940, this billing information is sent to Local Exchange Carrier (LEC) computer 675, authorizing LEC computer 675 to post an access charge to the end-user's account where it shows up on his monthly phone bill 675. Access management computer 510 then searches session code database 575 to change the status of session code 50 to "completed" at step 945. An end-user activating a session code, but not using it, will of course not generate the pricing data sent to LEC computer 675 at step 940. Access management computer 510 may send a nominal charge to LEC computer 675 in order to cover transport charges of the 900-number call used to activate session code 50.

The above embodiment describes session codes 50 generated at access management computer 510, transmitted to information barrier 430, provided to the end-user, and entered into 900-number network 600. Those skilled in the art will appreciate that session code 50 can be transmitted directly from access management computer 510 to 900-number network 600. After reaching information barrier 430, the end-user is instructed to call 900-number network 600 to receive session code 50. This code is then entered at information barrier 430 where it is verified by access management computer 510 as previously described.

In another embodiment, session code database 575 contains fields in addition to code, status, and pricing data. Such fields may include remaining uses, dollar value remaining, expiration date, start date, time remaining, valid information providers, valid information, etc. The remaining uses field is an integer indicating the number of times that session code 50 may be used before its status is changed to "completed" while the dollar value remaining field contains a dollar amount which is reduced as information 450 is purchased. A field for expiration date allows session codes 50 to expire on a given date while a field for start date allows session codes 50 to remain unusable (status of "pending") until a given date, regardless of whether or not the end-user has called the 900-number to activate session code 50. A test field for valid information providers enables session codes 50 to be designated for a particular information provider 410. Attempts to use session code 50 at another information provider 410 are denied. A field for valid information is used to restrict information 450 purchases to a class of information 450 (such as education, business, etc.) or to a particular piece of information 450.

In another embodiment, information barrier 430 contains a database capable of storing session codes 50. Instead of requesting session code 50 from access management computer 510, information barrier 430 changes the status of one session code 50 to "pending" and provides it to the end-user. After billing network 600 transmits session code 50 to access management computer 510 the code is transmitted back to information barrier 430, thereby allowing information barrier 430 to perform a local look-up of session code 50 provided by the end-user.

In yet another embodiment, end-user computer 310 contains secure processor 355 and secure storage 377 capable of storing session code database 575. Conventional secure tokens such as National Semiconductor's iPower Card can perform both functions. Secure processor 355 is used to process communications with data network 400 and billing network 600, while secure storage 377 stores session code database 575. When the end-user logs on to data network 400, secure processor 355 is treated as access management computer 510. Information barrier 430 requests session code 50 from secure processor 355, which in turn searches session code database 575 within secure storage 377. After calling 900-number network 600, the end-user types in session code 50 into secure storage 377 (with the use of a separate code provided by 900-number network 600) where its status is changed to "active." When the end-user logs on to data network 400 and reaches information barrier 430, information barrier 430 queries secure processor 355 to see if session code 50 is "active." Pricing data is then transferred to 900 number network 600.

In all of the above embodiments, all messages transmitted (including session codes 50 and pricing data) between data network 400, access management system 500, and 900-number network 600 may be encrypted for additional security. Secure processor 555 of access management computer 510 serves to encrypt and decrypt such messages.

Synchronous Embodiment

Figure 10A:
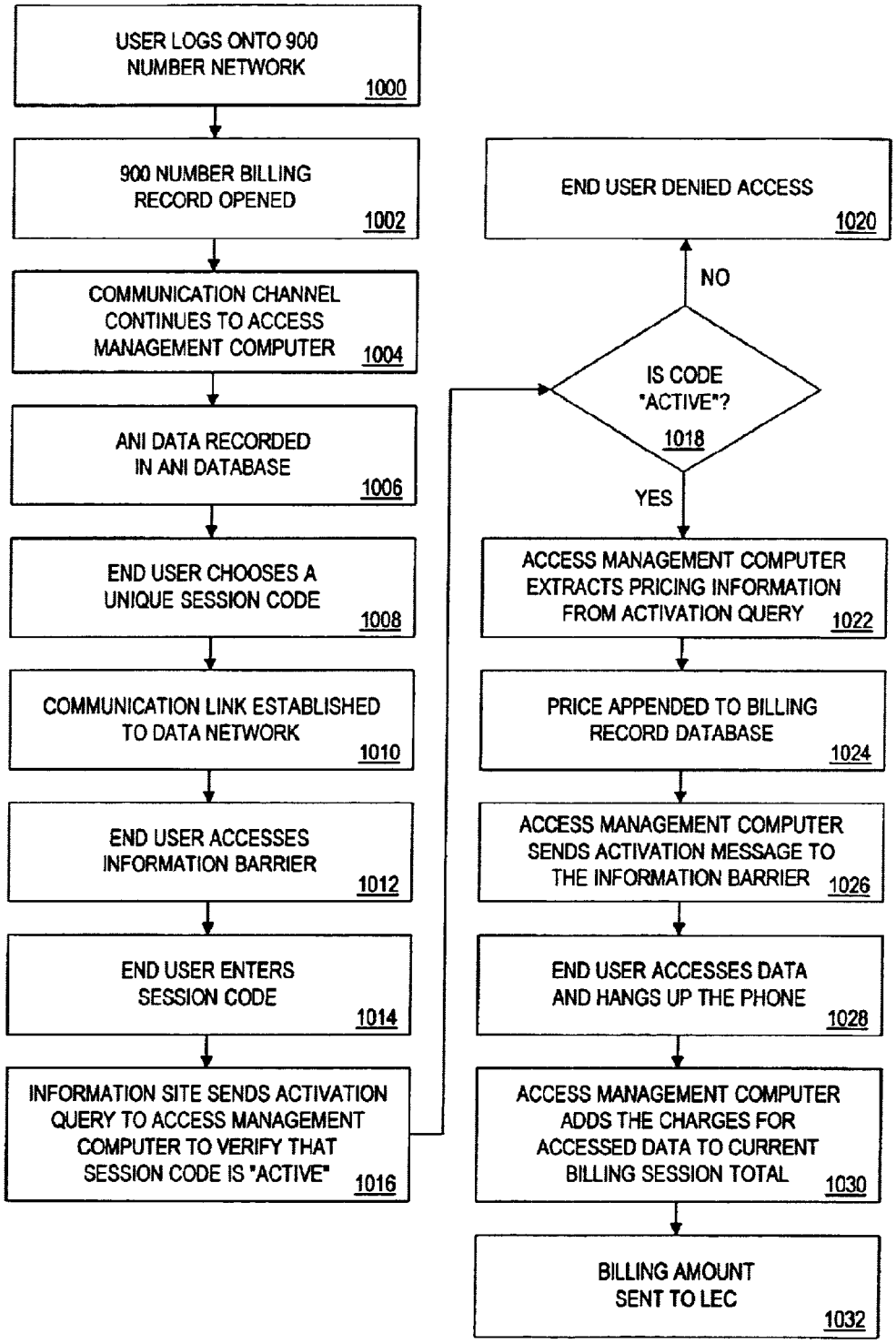
FIGS. 10A, 10B, and 10C illustrate an exemplary synchronous embodiment.

Referring now to FIG. 10A, there is depicted an exemplary embodiment of a single line synchronous access protocol of the present invention. This embodiment requires the user to access data network 400 through 900-number network 600, using 900-number network 600 as a gateway. Access management computer 510 allows continued access to data network 400 as long as the end-user is connected to 900-number network 600. At step 1000, the end-user logs on to 900-number network 600 which immediately opens a 900-number billing record at step 1002. This record might indicate that phone number xxx-555-1212 opened a call at, for example, 7:52 PM on May 7, 1996. The communications channel is then continued to access management computer 510 at step 1004. Automatic Number Identification (ANI) systems automatically capture the phone number of the end-user, storing it at step 1006 in ANI database 584. If ANI data is not available, the end-user is denied access. At step 1008, the end-user chooses a short series of digits or letters which are then concatenated with the ANI data to form session code 50. Since ANI data is unique to each individual phone line, the resulting concatenated session code 50 must also be unique.

At step 1010, the communication link is established to data network 400. After locating desired information 450, the end-user proceeds to the appropriate information barrier 430 at step 1012. At step 1014, the end-user enters session code 50 that he previously provided to access management computer 510 at step 1008. At step 1016, information barrier 430 queries active session code database 575 at access management computer 510 in order to determine whether or not session code 50 is still in session code database 575. CPU 520 of the access management computer 510 performs a database search of session code database 575 at step 1018, denying access to information 450 at step 1020 if session code 50 is not "active." If session code 50 is in session code database 575, access management computer 510 extracts pricing information from the activation query at step 1022. At step 1024, the price is appended to billing record database 580. At step 1026, access management computer 510 authorizes information barrier 430, indicating that the end-user should now be allowed access to information 450. After information 450 is communicated, the end-user hangs up the phone at step 1028. Access management computer 510 adds the charges for accessed data to the current session total at step 1030 and then sends the amount to LEC computer 675 at step 1032. The end-user may also choose not to terminate the call, proceeding to another information barrier 430 for additional information 450.

Access management computer 510 monitors, either continuously or at fixed-time intervals, the ANI information provided by 900-number network 600. When the ANI is no longer presented by 900-number network 600, access management computer 510 denies access through information barrier 430 by deleting session code 50 from session code database 575.

Figure 10B:
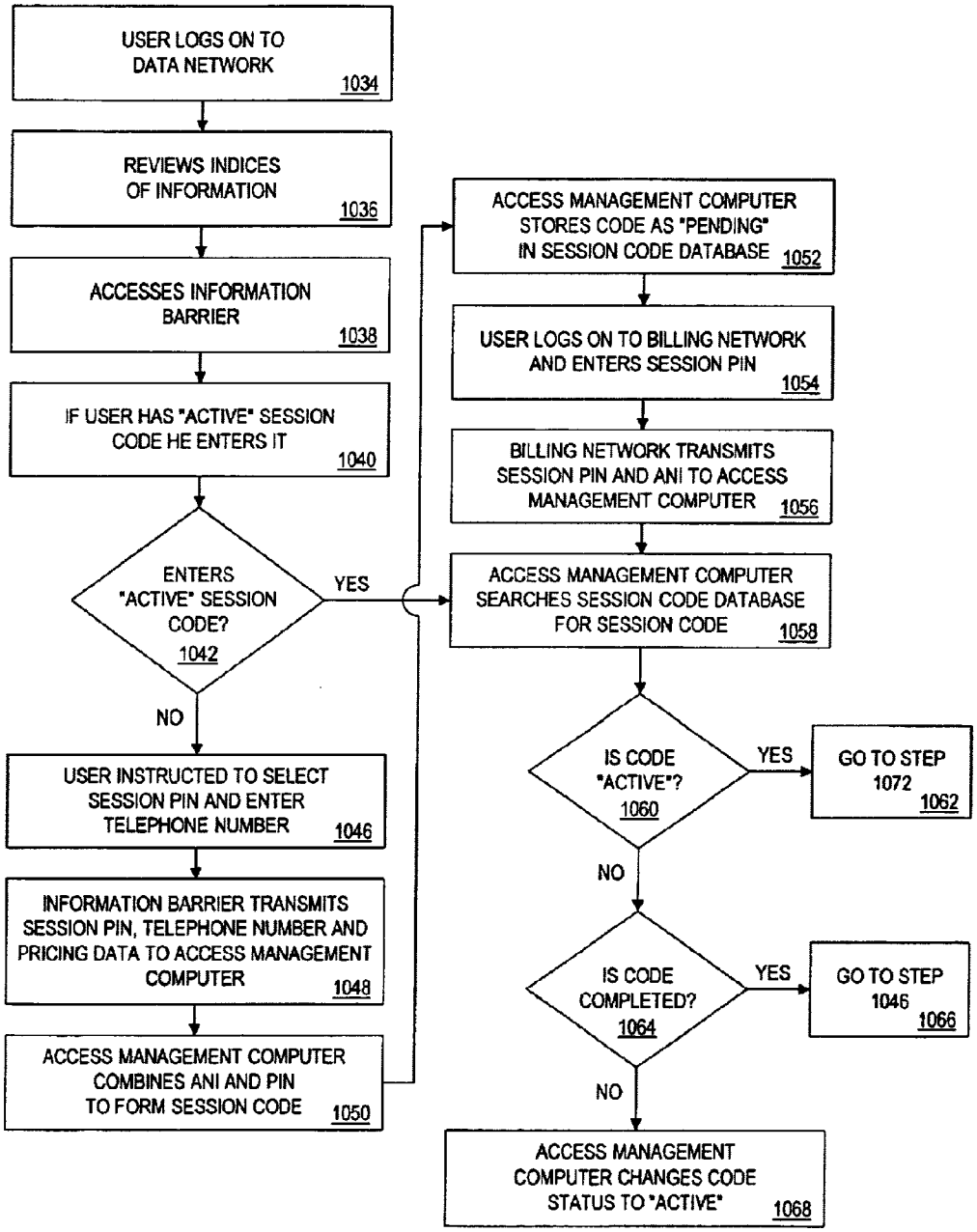
Figure 10C:
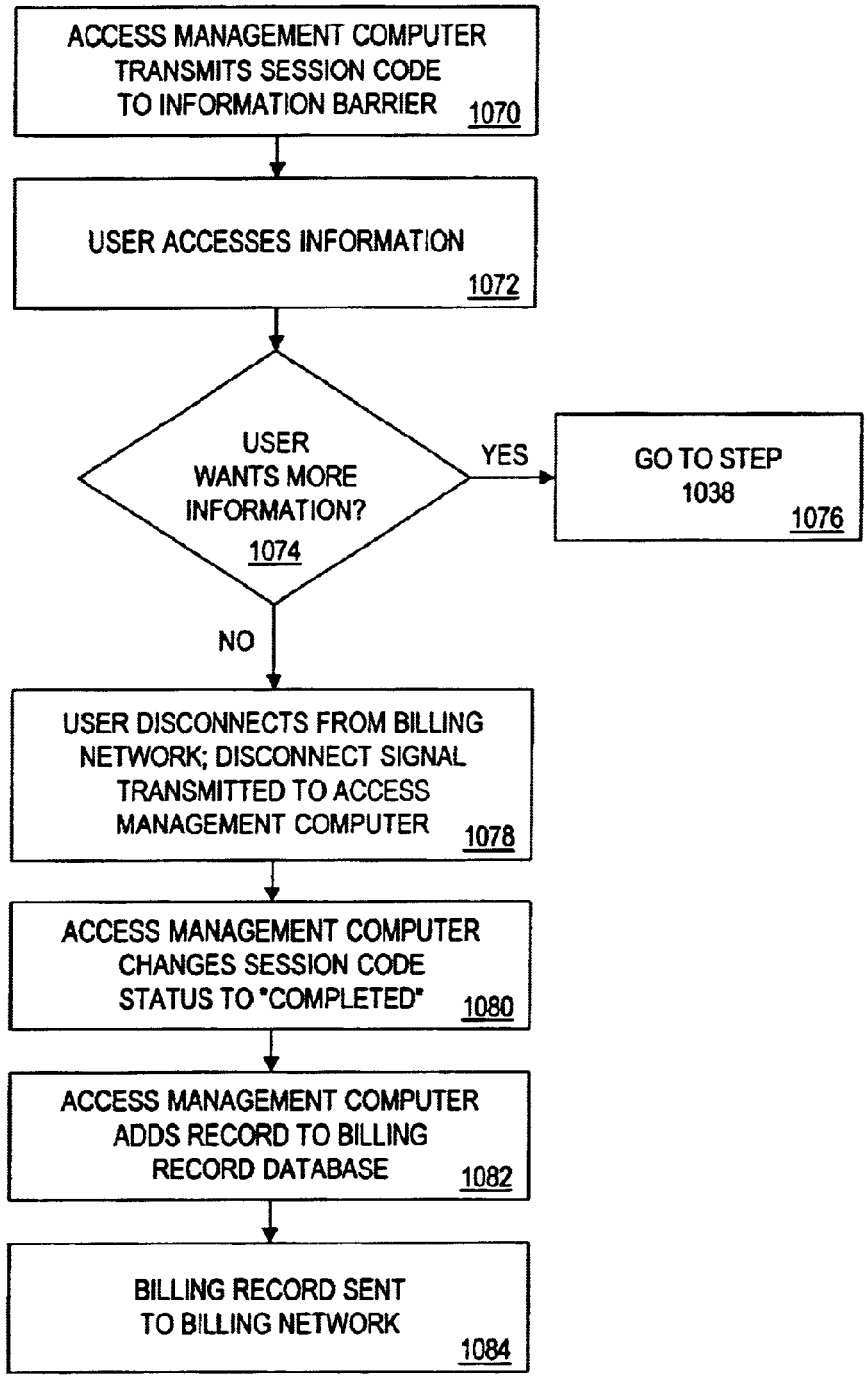

FIGS. 10B and 10C illustrate another synchronous embodiment in which the end-user simultaneously accesses both data network 400 and billing system 600. Unlike the previous embodiment, however, the end-user employs two separate lines of communication.

Referring now to FIG. 10B, there is shown the process by which the end-user establishes an "active" session code 50. At step 1034 the end-user logs on to data network 400 and reviews indices of information 420 at step 1036. At step 1038 the end-user accesses information barrier 430. Then, at step 1040, the end-user is presented with a screen requesting that session code 50 be entered. As the end-user has not yet activated session code 50, he is unable to enter it at step 1042. Once the end-user activates session code 50 and enters it at step 1042, he proceeds to step 1058 as indicated at step 1044.

At step 1046, the end-user is instructed to select a session PIN and enter his telephone number. At step 1048, information barrier 430 transmits the entered session PIN, telephone number, and pricing data to access management computer 510. At step 1050, access management computer 510 combines ANI and session PIN to form session code 50. Access management computer 510 then changes the status of session code 50 to "pending" in session code database 575 at step 1052. At step 1054, the end-user logs on to billing network 600 over the second communications line and enters his session PIN. At step 1056, billing network 600 transmits session PIN and ANI to access management computer 510, where a search is performed to find session code 50 in session code database 575 at step 1058. If session code 50 is found to be active at step 1060, the end-user continues to step 1072 as indicated by step 1062. If the code is not found to be "active" at step 1060, it is checked to see if the code is "completed" at step 1064. If "completed", the protocol returns to step 1046 as indicated at step 1066. If the status of session code 50 is not "completed," access management computer 510 changes the status of session code 50 to "active" at step 1068. At step 1070, access management computer 510 transmits session code 50 to information barrier 430 allowing the end-user access to information 450 at step 1072. If the end-user wants additional information 450 at step 1074, he proceeds to access information barrier 430 at step 1038, as indicated at step 1076.

If the end-user does not want more information at step 1074, he is disconnected from billing network 600 at step 1078 with the disconnect signal transmitted to access management computer 510. At step 1080, access management computer 510 changes the status of session code 50 to "completed" and adds a record to billing record database 580 at step 1082. At step 1084, the billing record is sent to billing network 600.

Limited Use Codes Embodiment

Figure 11:
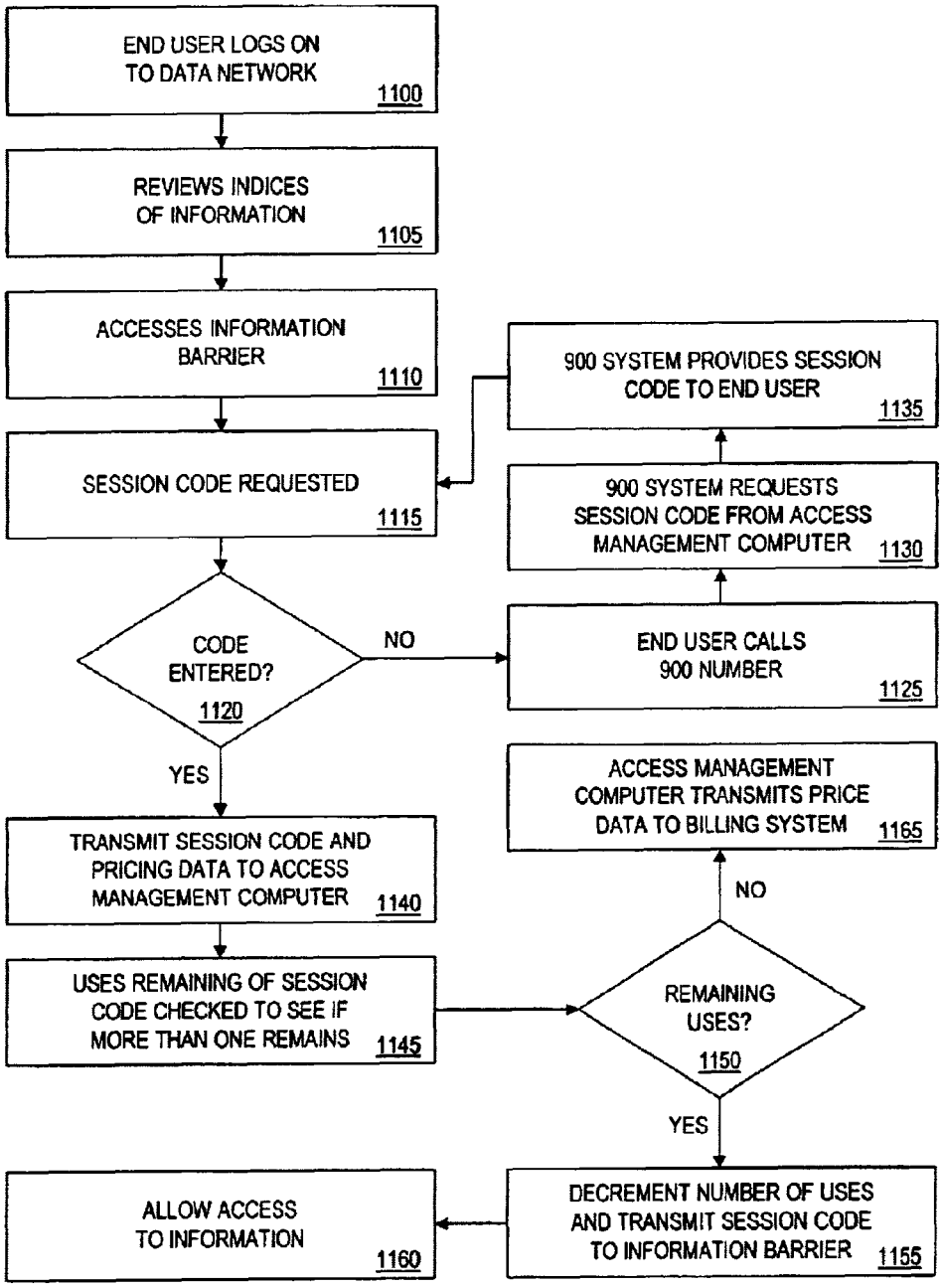
FIG. 11 illustrates an exemplary procedure for limited use access codes.

Referring now to FIG. 11, there is shown an exemplary procedure for permitting a user access to information for a fixed number of times. A session code 50 is used which expires after a predetermined number of uses for the purchase of information 450.

As previously described, the end-user logs on to data network 400 at step 1100, reviews indices of information 420 at step 1105, and then accesses information barrier 430 at step 1110. At step 1115, the end-user is requested to enter session code 50. As the end-user does not yet have session code 50 at step 1120, the end-user is requested to enter the number of uses that he wants, and is instructed to call the displayed 900-number at step 1125 in order to receive session code 50. Information barrier 430 sends a request to access management computer 510, instructing it to change the status of session code 50 to "pending" and change the 15 number of uses to the number requested by the end-user. At step 1130, 900-number network 600 requests session code 50 from access management computer 510. At step 1135, session code 50 is provided to the end-user who logs on to data network 400 and returns to step 1120 where he enters session code 50 at information barrier 430. Session code 50 is then transmitted along with pricing data to access management computer 510 at step 1140. Access management computer 510 performs a search of session code database 575 and retrieves the record for session code 50, checking the number of uses remaining at step 1145. If more than one use is indicated at step 1150, access management computer 510 decrements the number of uses by one and transmits session code 50 back to information barrier 430 at step 1155. The end-user is allowed access to information 450 at step 1160 and then proceeds to information barrier 430 at step 1110 if additional information 450 is desired. If the database record for session code 50 indicates no uses remaining at step 1150, access management computer 510 transmits pricing data to 900-number network 600.

In an alternative embodiment, session code 50 is valid for a given amount of time. Instead of determining the number of uses remaining at step 1145, access management computer 510 checks the time remaining field of session code 50, decrementing it by the time used in accessing information 450 at step 1155. In this embodiment, the end-user could be charged by the minute for watching part of a digital video, for example, with the number of minutes watched decremented from session code 50.

Physical Goods Purchase Embodiment

Figure 12:
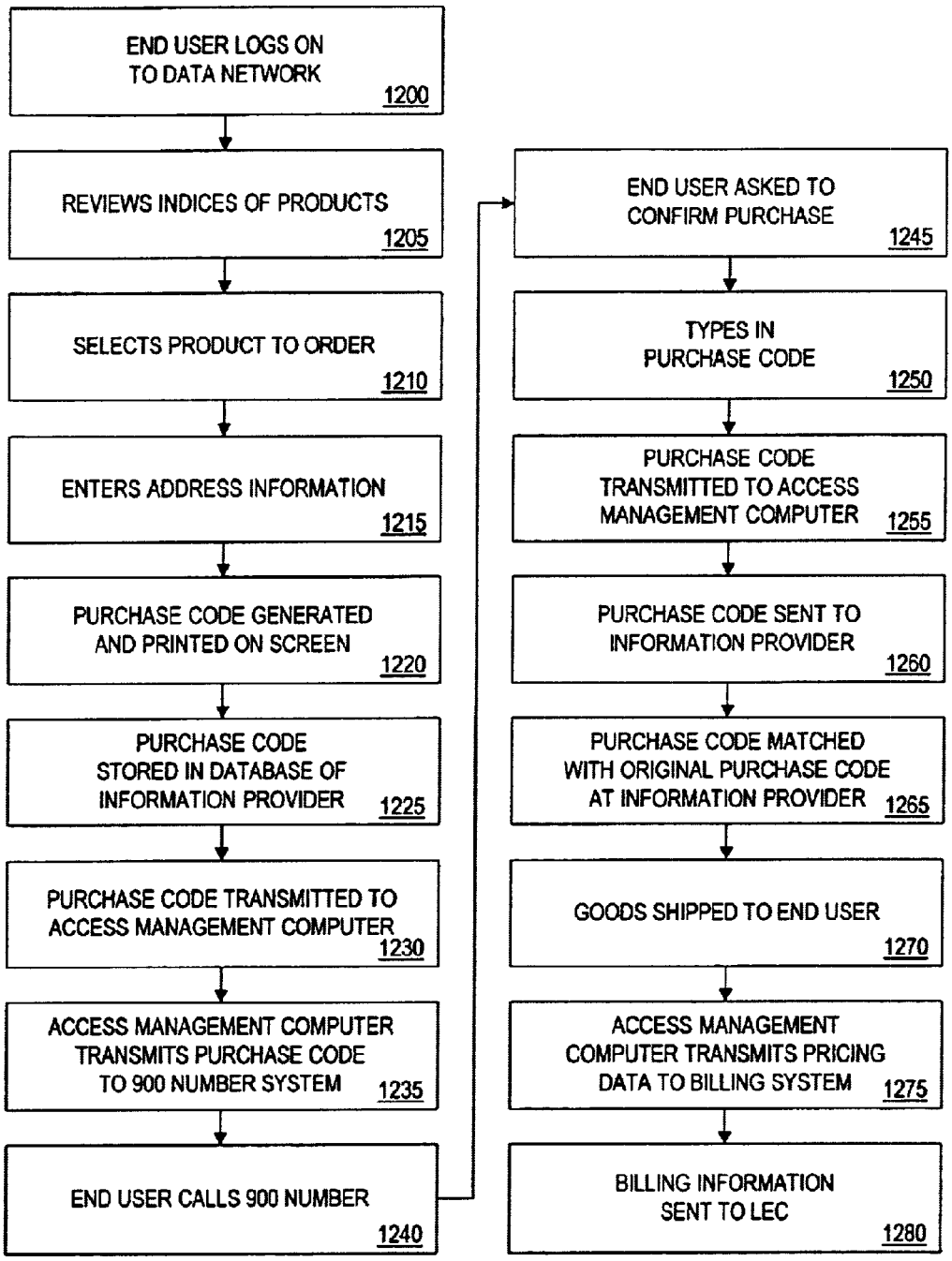
FIG. 12 illustrates an exemplary embodiment for purchasing physical goods.

FIG. 12 illustrates an embodiment for purchasing physical goods 40 with the present invention. The end-user logs on to data network 400 at step 1200 and reviews indices of products 425 at step 1205. This information is presented in a format similar to mail order catalogs, with a brief product description and price. An image or sound file may provide additional information. At step 1210, the end-user selects a product that he wishes to buy, triggering the appearance of product order form 75 which contains purchase code 70. The end-user is prompted to enter shipping address information into product order form 75 at step 1215. Purchase code 70 is created by information provider 410 and made available to the end-user by displaying it on video monitor 350 of end-user computer 310 at step 1220. At step 1225, purchase code 70 is stored in a database at information provider 410 so that it can be matched later with purchase code 70 returned from 900-number network 600. Product order form 75 is stored in the same database at information provider 410. Note that there is no need for information barrier 430 since there is no information 450 to which the end-user is denied access.

At step 1230, purchase code 70 is transmitted to access management computer 510. At step 1235, purchase code 70 is sent to 900-number provider computer 610 by access management computer 510. The end-user calls the 900-number at step 1240 and is connected to IVRU 590 which then prompts the end-user to confirm the purchase at step 1245 by entering purchase code 70 at step 1250. Purchase code 70 is then transmitted to access management computer 510 at step 1255, allowing confirmation of the presence of purchase code 70 in purchase code database 577. If purchase code 70 is present, access management computer 510 transmits purchase code 70 to information provider 410 at step 1260. If purchase code 70 is not found in purchase code database 577, the end-user is asked to re-enter purchase code 70. Once purchase code 70 is received by information provider 410, it is matched with stored purchase code 70 of product order form 75 at step 1265. If the two purchase codes 70 correspond to each other (i.e. they match), physical goods 40 are shipped to the end-user at step 1270. Contemporaneous with the transmission of purchase code 70 at step 1255, access management computer 510 sends pricing data to 900-number network 600 at step 1275. This billing information is then sent to the LEC at step 1280.

Digital Tokens Embodiment

Figure 13:
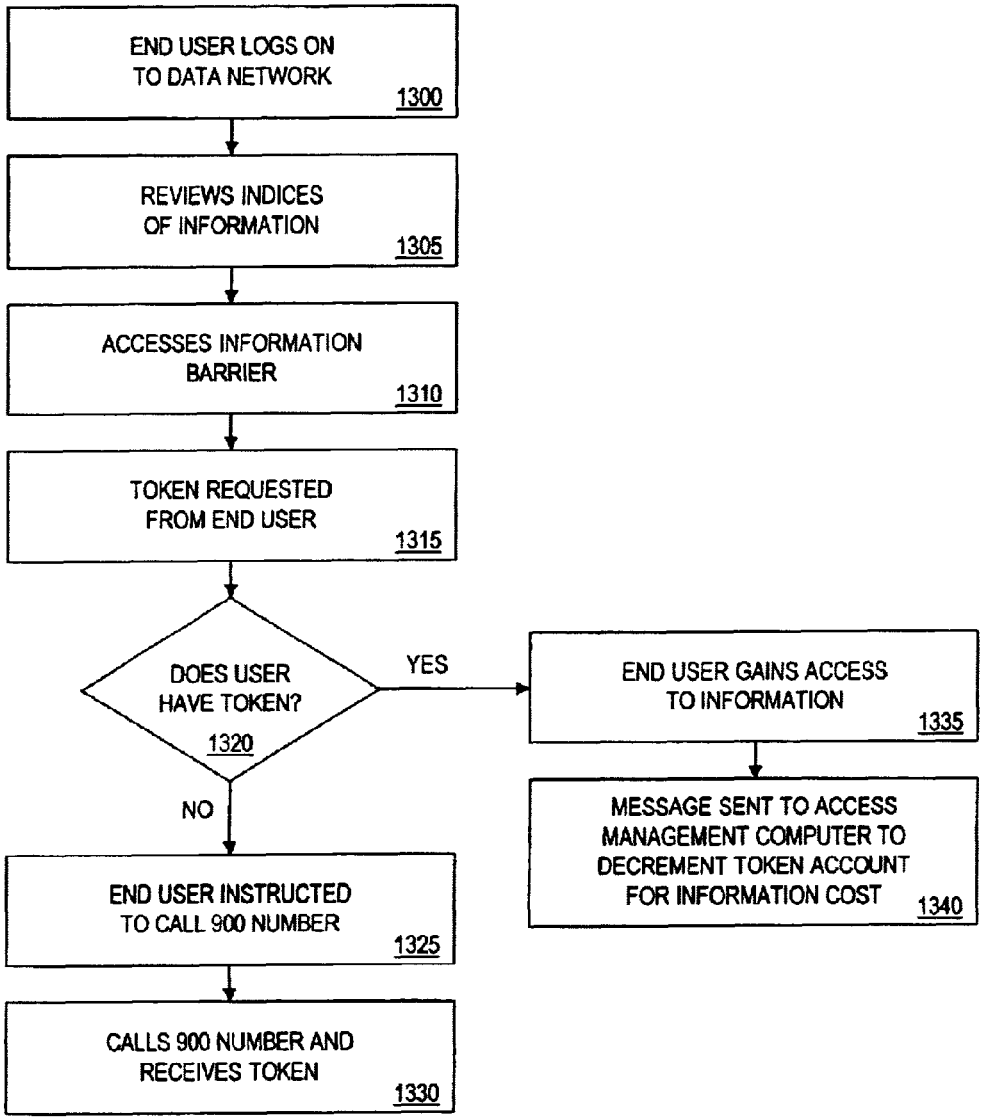
FIG. 13 illustrates an exemplary procedure for the use of digital tokens in the purchase of information.

As shown in FIG. 13, there is illustrated a procedure for the use of digital tokens for the purchase of information 450. Rather than receiving session codes generated for the purchase of a specific piece of information 450, tokens offer a more generic method for purchasing information 450. The end-user logs on to data network 400 at step 1310, reviews indices of information 420 at step 1320, and then accesses information barrier 430 at step 1330. Information barrier 430 requires that the end-user enter a valid token 95 at step 1340 in order to gain access to information 450. At step 1350, information barrier 430 determines whether or not the end-user has entered token 95. If he has not entered token 95, he is instructed to call a 900-number at step 1360. After calling the 900-number at step 1370, the end-user receives token 95 and proceeds again to information barrier 430 at which point he enters token 95. If the user has entered a valid token, he is granted access to information 450 at step 1380. At this point a message is sent to access management computer 510 to decrement the token account for the cost of the information 450.

Off-Line Digital Information Purchase Embodiment

In one embodiment of the present invention, digital information is sold directly through billing network 600. The end-users dials a 900-number and connects to IVRU 590. He is presented with a menu of information 450 that may be purchased, much like an audio version of index of information 420. Information 450 to be purchased may include anything in audio form. Electronic tickets, for example, could be sold with this system. A concert could sell unique digital codes which are validated upon presentation at the concert. The end-user presents the code upon arrival at the concert. Concert management calls the 900-number provider to verify that the code provided by the end-user had indeed been sold. Revenues from the 900-number call are shared with concert management. In another example, electronic tickets to on-line or off-line games are sold with the inventive system. Entry fees to trivia tournaments held on a commercial on-line service provider can be represented by unique digital codes, sold via a call to a 900-number. Similarly, games played on handheld electronic devices may be enabled to accept digital codes sold through a 900-number phone call. Data can also be distributed on CD-ROM in encrypted form, with end-users calling a 900-number to receive cryptographic codes capable of decrypting information 450 stored on the CD-ROM.

In alternative embodiment, the end-user uses a local printer to print tickets for entertainment events like concerts or sporting events. DTMF tones generated by the call to the 900-number transmit information 450 to the local printer. Those skilled in the art will understand that this printing device may be a small handheld device specifically adapted for the purpose of printing tickets, or a printer attached to a PC which utilizes a local software program that enables the tickets to be printed. For example, an end-user observes an advertisement for a Rolling Stones concert and would like to purchase a ticket. The end-user dials a 900-number and is connected to an IVRU which directs him through a series of questions relating to concert dates, quantity and seat selection. The IVRU has a list of currently available seats on file, allowing the end-user a variety of custom choices. The end-user selects from the list of available seats and completes the order for the ticket(s). The IVRU then downloads ticket data via DTMF tones or issues a code for the end-user to enter into the ticket printing device. The appropriate ticket prints and is available for immediate use.

Billing Embodiment

Figure 14:
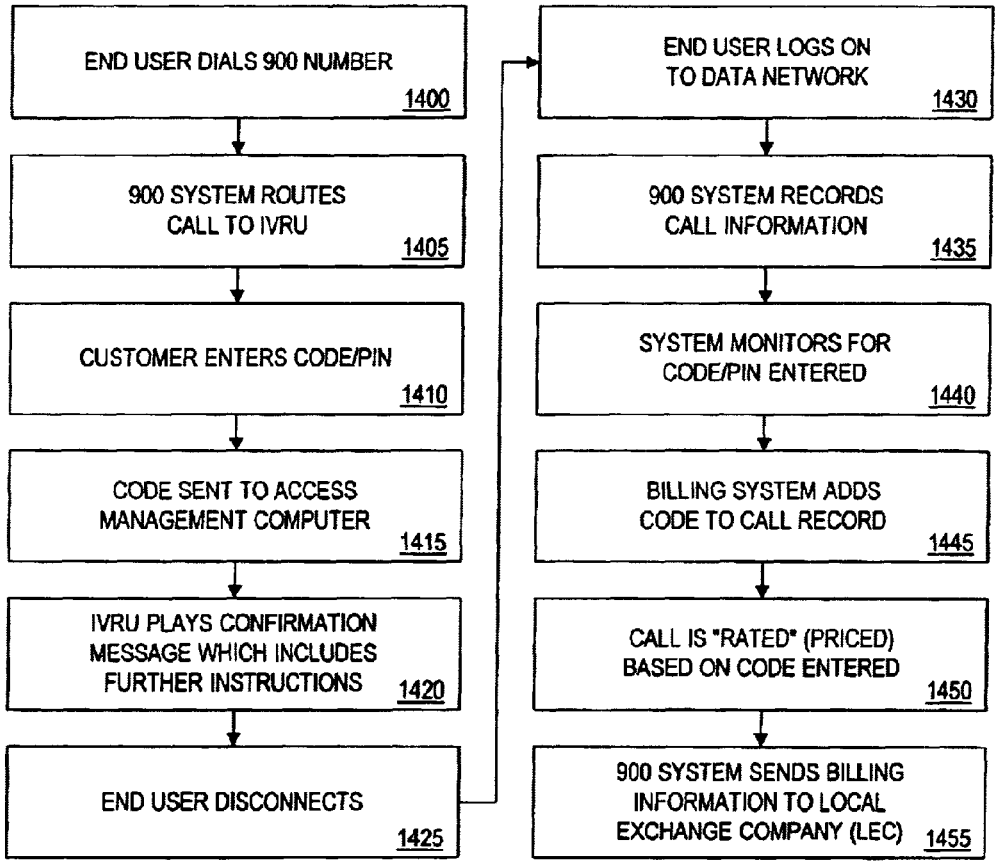
FIG. 14 illustrates operational aspects of the billing system.

FIG. 14 illustrates one embodiment of the operational aspects of the billing system in which pricing data is incorporated into session code 50, describing how the price of information 450 is incorporated into phone bill 695 which the end-user receives at the end of the month. For information about 900-number billing and collection systems, one of ordinary skill in the art may refer to Robert Mastin, 900 Know-how: How to Succeed With Your Own 900 Number Business, Aegis Publishing Group, 1995 or AT&T's FCC Tariff No. 1.

At step 1410, the end-user dials the 900-number. At step 1415, 900-number network 600 routes the call to IVRU 590. The end-user enters session code 50 or session PIN at step 1420, using the touch-tone keys of his phone. At step 1425, this code is sent to access management computer 510 where it is compared with session codes 50 stored in session code database 575. At step 1430, IVRU 590 communicates a confirmation message which includes session code 50 and further instructions to the end-user. The end-user disconnects at step 1435 and then logs on to data network 400 to access information 450 at step 1440. While the end-user was still connected to 900-number network 600, information about the call was being recorded at step 1445. At step 1450, the system monitors for session code 50, extracting pricing information which is added to the call record at step 1455. At step 1460, the call is priced based on session code 50 entered. At step 1465, 900-number network 600 sends the billing information to the local exchange company (LEC).

Figure 15:
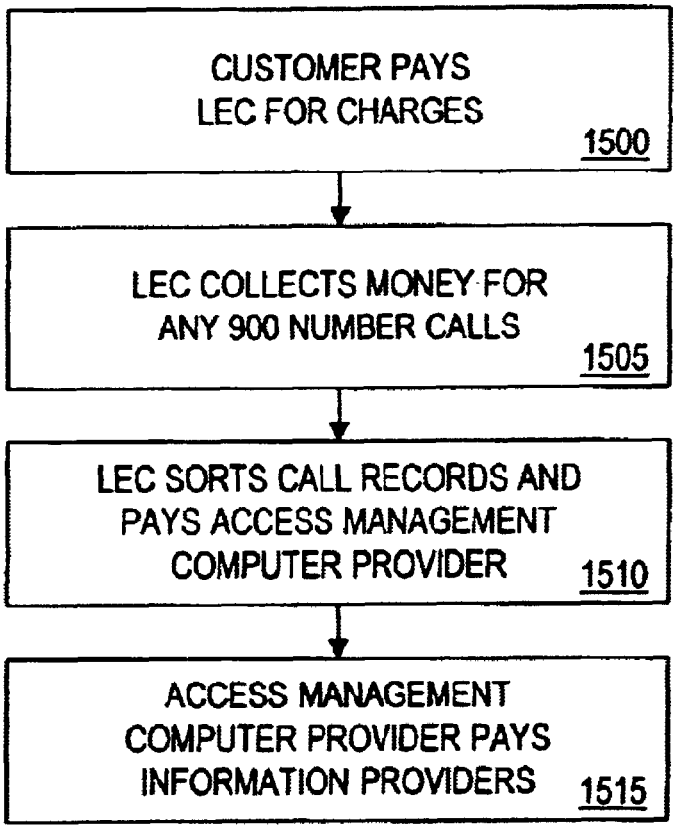
FIG. 15 illustrates the process of collecting payment from the end-user, and the distribution of these funds to the content and system providers.

Referring now to FIG. 15, there is depicted a procedure for LEC billing and collection. At step 1510, the end-user pays the LEC for charges that have appeared on his monthly phone bill 695. After collecting the money for all 900 calls at step 1520, the LEC sorts the call records and makes payment to access management computer 510 at step 1530, sharing the 900-number revenues between billing system 600 and access management system 500. At step 1540, access management system 500 then pays information providers 410 for the content provided.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be apparent to those skilled in the art based on the present disclosure.

What is claimed is:

[1. A method for utilizing a billing site to toll a user's access to digital data at a data site through signaling an access management computer to authorize said user's access to said digital data, comprising the steps of:

receiving at said billing site a user's request for access to said digital data, said request for access being associated with a billing account for charging said user, said request for access including a code corresponding to said digital data, wherein said billing site comprises a shared-revenue communications line;

routing from said billing site to said access management computer a signal indicating that said billing site has received said code corresponding to said user request for access to said digital data;

receiving at said billing site from said access management computer a signal that said user has received access to said digital data; and posting via said billing site an access charge to said billing account based upon said user's access to said digital data.]

[2. The method of claim 1, wherein said shared-revenue communications line comprises a "900" telephone line or equivalent.]

[3. The method of claim 1, wherein said routing step includes the step the step of establishing a communications link with said access management computer for the period that said user is authorized access to said data site.]

[4. Apparatus for tolling a user's access to digital data at a data site by signaling an access management computer to authorize said user's access to said digital data, said apparatus comprising:

means for receiving, at a billing site that comprises a shared revenue communications line, a user's request for access to said digital data, said request for access being associated with a billing account for charging said user, said request for access including a code corresponding to said digital data;

means for routing to said access management computer a signal indicating the receipt of said code corresponding to said user request for access to said digital data;

means for receiving from said access management computer a signal that said user has received access to said digital data; and means for posting an access charge to said billing account based upon said user's access to said digital data.]

[5. The apparatus of claim 4, wherein said shared-revenue communications line comprises a "900" telephone line or equivalent.]

[6. The apparatus of claim 4, further comprising a communications link maintained with said access management computer during the time said user accesses said digital data.]

[7. A method for a user to access stored digital information at a data site, comprising the steps of:

communicating from said user to a billing system a first access code authorizing said billing system to charge a billing account for access to said stored digital information at said data site;

receiving by said user from said billing system a second access code permitting said user to access said stored digital information at said data site;

connecting by said user to said data site; and providing from said user to said data site said second access code whereby to gain access to said stored digital information.]

[8. The method of claim 7, wherein said first and second access codes are identical.]

[9. The method of claim 7, wherein said first and second access codes are generated by an access management computer separate from and in communication with both said billing system and said remote data site.]

[10. The method of claim 7, wherein said billing system comprises a shared-revenue communications line.]

[11. The method of claim 10, wherein said shared-revenue communications line comprises a "900" telephone line or equivalent.]

[12. The method of claim 7, and further including the steps of:

establishing with said billing system a data communications link; and establishing with said remote data site a communications link.]

[13. The method of claim 12, wherein said communications link with said billing system and said communications link with said remote data site are established simultaneously for at least a period of time during which said user is connected to said remote data site.]

[14. The method of claim 12, wherein said communications link with said billing system and said communications link with said remote data site are established at separate times.]

[15. A user computer for a user to access stored digital information at a remote data site while said user access to said remote data site is tolled by a billing system, comprising:

means for communicating from said user to said billing system a first access code authorizing said billing system o charge a billing account for access to said stored digital information;

means for receiving by said user from said billing system a second access code permitting said user to access said stored digital information at said data site;

means for connecting by said user to said data site; and means for providing from said user to said data site said second access code whereby to gain access to said stored digital information.]

[16. The user computer of claim 15, wherein said first and second access codes are identical.]

[17. The user computer of claim 15, wherein said first and second access codes are generated by an access management computer separate from and in communication with both said billing system and said remote data site.]

[18. The user computer of claim 15, wherein said billing system comprises a shared-revenue communications line.]

[19. The user computer of claim 18, wherein said shared-revenue communications line comprises a "900" telephone line or equivalent.]

[20. The user computer of claim 15, and further including:

means for establishing a data communications link with said billing system; and means for establishing a data communications link with said remote data site.]

[21. The user computer of claim 20, wherein:

said means for establishing said data communications link with said billing system and said means for establishing said data communications link with said remote data site are separate, whereby said data communications links may be established simultaneously for at least a period of time during which said user is connected to said remote data site.]

[22. The user computer of claim 21, wherein:

said data communications link with said billing system and said data communications link with said remote data site are established at separate times.]

[23. A method for utilizing a billing site to toll a user's access to a data site through an access management computer, comprising the steps of:

establishing a communications link between said user and said billing site, said communications link associated with a billing, account for charging said user;

establishing a communications link between said billing site and said access management computer;

sending from said billing site to said access management computer a signal indicating that said communications link between said user and said billing site is active, whereby to authorize said user access to said data site;

receiving at said billing site from said access management computer a signal that said user has received access to said data site; and posting via said billing site an access charge to said billing account based upon said user's access to said data site.]

[24. The method of claim 23, wherein said billing site comprises a shared-revenue communications line.]

[25. The method of claim 24, wherein said shared-revenue communications line comprises a "900" telephone line or equivalent.]

[26. The method of claim 23, further including the step of sending from said billing system to said access management computer a signal indicating if said communications link between said user and said billing system becomes inactive, whereby to terminate the authorization of said user to access said data site.]

[27. Apparatus for tolling a user's access to a data site by signaling an access management computer to authorize said user's access to said data site, said apparatus comprising:

means for establishing a communications link with a user;

means for receiving via said communications link a user's request for access to said data site, said request for access being associated with a billing account for charging said user;

means for routing to said access management computer a signal indicating that said communications link with said user is active, whereby to authorize said user access to said data site;

means for receiving from said access management computer a signal that said user has received access to said data site; and means for posting an access charge to said billing account based upon said user's access to said data site.]

[28. The apparatus of claim 27, wherein said billing site comprises a shared-revenue communications line.]

[29. The apparatus of claim 28, wherein said shared-revenue communications line comprises a "900" telephone line or equivalent.]

[30. The apparatus of claim 27, further comprising means for routing to said access management computer a signal that said communications link with said user is inactive, whereby to terminate the authorization of said user to access said data site.]

*31. A method to access stored digital information at a data site, the method comprising:*

*communicating, from a computing device to a billing system, a first access code authorizing said billing system to charge a billing account for access to said stored digital information at said data site;*

*receiving from said billing system a second access code permitting said computing device to access said stored digital information at said data site;*

*connecting said computing device to said data site; and*

*providing to said data site said second access code to gain access to said stored digital information.*

*32. The method of claim 31, wherein said first and second access codes are identical.*

*33. The method of claim 31, wherein said first and second access codes are generated by an access management computer separate from and in communication with both said billing system and said data site.*

*34. The method of claim 31, wherein said billing system couples a shared communications line.*

*35. The method of claim 31, and further comprising:*

*establishing with said billing system a data communications link; and*

*establishing with said data site a communications link.*

*36. A method for utilizing a billing site to toll access to digital data at a data site through signaling an access management computer to authorize said access to said digital data, the method comprising:*

*receiving, by a computer of said billing site, a request for access to said digital data, said request for access being associated with a billing account and including a code corresponding to said digital data wherein said billing site comprises a shared-revenue communications line;*

*routing, from said billing site to said access management computer, a signal indicating that said billing site has received said code;*

*receiving, at said billing site from said access management computer, a signal corresponding to receipt of access to said digital data; and*

*posting via said billing site an access charge to said billing account based upon said access to said digital data.*

*37. The method of claim 36, wherein the billing system couples a shared communications line.*

*38. The method of claim 36, wherein said routing step further comprises establishing a communications link with said access management computer for a period that a user is authorized access to said data site.*

*39. The method of claim 36, wherein said access management computer and said billing site are located remotely from each other.*

*40. The method of claim 36, wherein said code is generated by said access management computer.*

*41. The method of claim 36, wherein said code includes a telephone number of a user.*

*42. The method of claim 36, wherein said code includes pricing information corresponding to a user's access to said digital data.*

*43. The method of claim 36, wherein said code includes usage information corresponding to a number of times said code may be used.*

*44. A non-transitory computer readable storage medium storing instructions to access stored digital information at a data site, the instructions, when executed at least one processor to:*

*communicate to a billing system a first access code authorizing said billing system to charge a billing account for access to said stored digital information at said data site;*

*receive from said billing system a second access code to permit access to said stored digital information at said data site;*

*connect to said data site; and*

*provide to said data site said second access code to gain access to said stored digital information.*

*45. The computer readable storage medium of claim 44, wherein said first and second access codes are identical.*

*46. The computer readable storage medium of claim 44, wherein said first and second access codes are generated by an access management computer separate from and in communication with both said billing system and said data site.*

*47. The computer readable storage medium of claim 44, wherein said billing system couples a shared communications line.*

*48. The computer readable storage medium of claim 44, wherein execution of the instructions further cause the at least one processor to:*

*establish with said billing system a data communications link; and*

*establish with said data site a communications link.*

* * * * *